United States Patent
Matsumoto

(10) Patent No.: US 11,466,771 B2
(45) Date of Patent: Oct. 11, 2022

(54) TRANSMISSION-EQUIPPED VEHICLE

(71) Applicant: KAWASAKI MOTORS, LTD., Akashi (JP)

(72) Inventor: Yuuka Matsumoto, Himeji (JP)

(73) Assignee: KAWASAKI MOTORS, LTD., Akashi (JP)

( * ) Notice: Subject to any disclaimer, the term of this patent is extended or adjusted under 35 U.S.C. 154(b) by 220 days.

(21) Appl. No.: 17/007,363

(22) Filed: Aug. 31, 2020

(65) Prior Publication Data

US 2021/0071753 A1    Mar. 11, 2021

(30) Foreign Application Priority Data

Sep. 5, 2019    (JP) .............................. JP2019-162159

(51) Int. Cl.
| | | |
|---|---|---|
| *F16H 59/02* | (2006.01) | |
| *F16H 59/04* | (2006.01) | |
| *F16H 61/30* | (2006.01) | |
| *F16H 61/32* | (2006.01) | |
| *B60W 30/19* | (2012.01) | |
| *B62M 25/08* | (2006.01) | |

(Continued)

(52) U.S. Cl.
CPC ......... *F16H 59/0204* (2013.01); *B60K 17/00* (2013.01); *B60K 23/00* (2013.01); *B60Q 9/00* (2013.01); *B62M 25/08* (2013.01); *F16H 59/04* (2013.01); *F16H 61/12* (2013.01); *F16H 61/26* (2013.01); *B60Y 2300/182* (2013.01); *B62M 25/06* (2013.01)

(58) Field of Classification Search
CPC ... B62M 25/08; B62M 25/06; F16H 59/0204; F16H 59/04; F16H 61/12; F16H 61/26; B60K 17/00; B60K 23/00; B60Q 9/00; B60Y 2300/182

See application file for complete search history.

(56) References Cited

U.S. PATENT DOCUMENTS

| | | | | |
|---|---|---|---|---|
| 8,831,845 B1 * | 9/2014 | Tao | ........................ | F16H 61/688 |
| | | | | 701/58 |
| 2019/0003586 A1 * | 1/2019 | Merienne | .............. | F16H 63/304 |

FOREIGN PATENT DOCUMENTS

| | | | | | |
|---|---|---|---|---|---|
| JP | 2012237347 A | | 12/2012 | | |
| KR | 1274277 B1 | * | 6/2013 | ............. | B60K 17/06 |
| KR | 20150129111 A | * | 11/2015 | ............. | F16H 63/30 |

\* cited by examiner

*Primary Examiner* — Tisha D Lewis

(74) *Attorney, Agent, or Firm* — Alleman Hall Creasman & Tuttle LLP

(57) ABSTRACT

A controller drives a shifting actuator to move a first engagement member from an original position of a first engagement portion in one direction along a relative motion path and acquires first position information representing a first position, the first position being a position where the first engagement portion moved in the one direction contacts a second engagement portion. The controller drives the shifting actuator to move the first engagement member from the original position in the other direction along the relative motion path and acquires second position information representing a second position where the first engagement portion moved in the other direction contacts the second engagement portion. The controller calculates a center position of the first engagement portion on the relative motion path from the acquired first position information and the acquired second position information, compares the calculated center position to the original position.

9 Claims, 13 Drawing Sheets

(51) Int. Cl.
  *B62M 25/00* (2006.01)
  *B60K 17/00* (2006.01)
  *B60K 23/00* (2006.01)
  *B60Q 9/00* (2006.01)
  *F16H 61/12* (2010.01)
  *F16H 61/26* (2006.01)
  *B62M 25/06* (2006.01)

TRANSMISSION-EQUIPPED VEHICLE

CROSS-REFERENCE TO RELATED APPLICATION

This application claims priority to and the benefit of Japanese Patent Application No. 2019-162159, filed on Sep. 5, 2019, the entire disclosure of which is incorporated herein by reference.

BACKGROUND OF THE INVENTION

Field of the Invention

The present invention relates to a transmission-equipped vehicle configured to perform a shifting process using a drive force of a shifting actuator.

Description of the Related Art

Japanese Laid-Open Patent Application Publication No. 2012-237347 discloses a shifting system incorporating an automatic shifting mode. In the automatic shifting mode, when a vehicle speed or any other parameter meets a predetermined condition, a shift control motor is driven to set a transmission in motion. In a manual shifting mode, when a shift select switch is operated by an operator, the shift control motor is driven to set the transmission in motion.

SUMMARY OF THE INVENTION

In the configuration disclosed in Japanese Laid-Open Patent Application Publication No. 2012-237347, even when the shifting system is in the manual shifting mode, the shifting power for allowing the transmission to perform a shifting process is not an operation force applied by the operator but a drive force generated by the shift control motor. To ensure a proper shifting process using a drive force of a shifting actuator such as a shift control motor, the non-shifting position of the shifting actuator needs to be appropriately set.

In the configuration as described above, the drive force of the shifting actuator is transmitted to the transmission through a shifting power transmission mechanism. When the shifting power transmission mechanism is removed from the vehicle for maintenance work or any other purpose and thereafter mounted on the vehicle again, the mounting may be done improperly. The improper mounting may preclude proper transmission of the drive force of the shifting actuator to the transmission. Additionally, the non-shifting position of the shifting actuator may be displaced with time.

It is therefore an object of the present invention to provide a transmission-equipped vehicle configured to perform a shifting process using a drive force of a shifting actuator and configured to reliably prevent failure of the shifting process due to improper mounting after maintenance work or due to a change with time.

A transmission-equipped vehicle according to one aspect of the present invention includes: a transmission that changes a speed of rotation produced by rotational power of a power source for travel of the vehicle; a shifting operation member operated by an operator; a manual shifting power transmission mechanism through which an operation force applied by the operator to the shifting operation member is transmitted to the transmission as shifting power for a shifting process; a shifting actuator; an automatic shifting power transmission mechanism through which a drive force of the shifting actuator is transmitted to the manual shifting power transmission mechanism as the shifting power; and a controller that controls the shifting actuator, wherein the automatic shifting power transmission mechanism includes a unidirectional transmitting part that, when the manual shifting power transmission mechanism is set in motion upon operation of the shifting operation member, cuts off transmission of the motion of the manual shifting power transmission mechanism to the shifting actuator and that permits transmission of the drive force of the shifting actuator to the manual shifting power transmission mechanism, the automatic shifting power transmission mechanism further includes: a first engagement member movable in conjunction with motion of the shifting actuator and provided with a first engagement portion; and a second engagement member movable in conjunction with the motion of the manual shifting power transmission mechanism and provided with a second engagement portion engageable with the first engagement portion, the unidirectional transmitting part includes a play portion formed between the first engagement portion and the second engagement portion on a relative motion path along which the second engagement member moves relative to the first engagement member in conjunction with the motion of the manual shifting power transmission mechanism, the controller is configured to, during a predetermined non-shifting period, execute a first detection procedure that detects a center position of the first engagement portion on the relative motion path, and in the first detection procedure, the controller drives the shifting actuator to move the first engagement member from an original position of the first engagement portion in one direction along the relative motion path and acquires first position information representing a first position, the original position corresponding to a non-shifting position of the shifting actuator, the first position being a position where the first engagement portion moved in the one direction contacts the second engagement portion, the controller drives the shifting actuator to move the first engagement member from the original position in the other direction along the relative motion path and acquires second position information representing a second position where the first engagement portion moved in the other direction contacts the second engagement portion, the controller calculates the center position of the first engagement portion on the relative motion path from the acquired first position information and the acquired second position information, and the controller compares the calculated center position to the original position and determines whether the original position is within a predetermined first range defined based on the center position.

In the above configuration, when the manual shifting power transmission mechanism is set in motion upon operation of the shifting operation member, transmission of the motion of the manual shifting power transmission mechanism to the shifting actuator is cut off by the unidirectional transmitting part. This can prevent the shifting actuator from causing mechanical resistance when the shifting operation member is operated. Thus, in the vehicle having both the manual shifting function and the automatic shifting function, the operator can enjoy an improved operational feeling during manual shifting. In the first detection procedure executed during the non-shifting period, the shifting actuator is driven until the first engagement portion comes into contact with the second engagement portion, and the positions of the first engagement portion at both ends of the relative motion path are detected with respect to the original position of the first engagement portion. Thus, the center position of the first engagement portion on the relative motion path can be determined. As such, the determination of whether the original position of the first engagement portion on the relative motion path is appropriate can be reliably made without setting the transmission and the shifting operation member in motion, in order to define the amount of play provided in the unidirectional transmitting part to cut off transmission of the motion of the manual shifting power transmission mechanism to the shifting actuator. Making the determination of whether the original position of the first engagement portion is appropriate can reliably prevent a shifting process from failing due to improper mounting after maintenance work or due to a change with time when the shifting process is effected using the drive force of the shifting actuator.

The transmission-equipped vehicle may further include a notifier that provides a notification of abnormality, and when the original position is outside the first range, the controller may cause the notifier to provide the notification of abnormality. In this configuration, when the original position of the first engagement portion is outside the first range defined as a reference for determining the presence or absence of abnormality, a notification of abnormality is provided. Thus, a notification of abnormality of the automatic shifting function can be provided before a shifting process is actually effected.

When the original position is outside the first range, the controller may set the non-shifting position of the shifting actuator such that the calculated center position is set as the original position. In this configuration, when the original position of the first engagement portion is outside the first range defined as a reference for determining whether resetting of the original position is needed, the original position is reset to the calculated center position. Thus, the occurrence of abnormality of the automatic shifting function can be prevented.

The transmission-equipped vehicle may further include a notifier that provides a notification of abnormality. When the original position is outside the first range and within a second range wider than the first range, the controller may set the non-shifting position of the shifting actuator such that the calculated center position is set as the original position, and when the original position is outside the second range, the controller may cause the notifier to provide the notification of abnormality.

In the above configuration, when the original position of the first engagement portion is outside the first range defined as a reference for determining whether resetting of the original position is needed, and within the second range defined as a reference for determining the presence or absence of abnormality, the original position of the first engagement portion is reset to the calculated center position. Further, when the original position of the first engagement portion is outside the second range defined as a reference for determining the presence or absence of abnormality, a notification of abnormality is provided. Thus, when the original position of the first engagement portion is within a range where the original position is resettable, the original position can be reset to prevent the occurrence of abnormality of the automatic shifting function. When the original position of the first engagement portion is in a range where the original position is not resettable, a notification of abnormality can be provided to inform the operator of the abnormality of the automatic shifting function before a shifting process is actually effected.

In the first detection procedure, the controller may control the drive force of the shifting actuator to a drive force for detection which is small enough not to set the manual shifting power transmission mechanism in motion, may determine the first position as a position where, when the shifting actuator is driven by the drive force for detection, the first engagement portion moved by the drive force for detection in the one direction along the relative motion path comes to a stop, and may determine the second position as a position where, when the shifting actuator is driven by the drive force for detection, the first engagement portion moved by the drive force for detection in the other direction along the relative motion path comes to a stop.

In the above configuration, even though the shifting actuator is driven during the first detection procedure, the manual shifting power transmission mechanism is not set in motion because of the smallness of the drive force. This makes it easy to ensure that the determination of whether the original position of the first engagement portion is appropriate is made without setting the transmission and the shifting operation member in motion. Further, by virtue of the restriction of the drive force of the shifting actuator, the first engagement portion comes to a stop upon contacting the second engagement portion. As such, the contact of the first engagement portion with the second engagement portion can easily be detected.

The controller may perform pulse width modulation (PWM) control of the drive force of the shifting actuator. In the shifting process, the controller may set a duty cycle of the PWM control to a first duty cycle, and in the first detection procedure, the controller may set the duty cycle of the PWM control to a second duty cycle lower than the first duty cycle. In this configuration, it is easy to achieve the adjustment of the drive force of the shifting actuator to the drive force for detection which is small enough not to set the manual shifting power transmission mechanism in motion.

The predetermined non-shifting period may be a period where a key switch is turned on. In this configuration, the determination as to the original position can be made before the vehicle begins to travel. This ensures that the determination as to the original position is made before a shifting process is actually effected.

The transmission-equipped vehicle may further include a change mechanism by which a shift drum is rotated to set a shift fork of the transmission in motion. The change mechanism may include: a change lever that pivots in conjunction with the motion of the manual shifting power transmission mechanism to rotate the shift drum in a stepwise fashion; and a stopper member that is secured to a case of the transmission and that restricts a range over which the change lever is pivotable. The controller may be configured to, when the shifting process is effected, execute a second detection procedure that detects an actuator center position of the shifting actuator on a motion path of the shifting actuator. In the second detection procedure, the controller may drive the shifting actuator from the non-shifting position in one direction along the motion path of the shifting actuator, and acquire third position information representing a third position where the change lever contacts the stopper member, may drive the shifting actuator from the non-shifting position in the other direction along the motion path of the shifting actuator, and acquire fourth position information representing a fourth position where the change lever contacts the stopper member, may calculate the actuator center position of the shifting actuator on the motion path from the acquired third position information and the acquired fourth position information, and may compare the calculated actuator center position to the non-shifting position and determine whether the non-shifting position is within a predetermined third range defined based on the actuator center position.

In the above configuration, when the shift drum is actually rotated using the drive force of the shifting actuator to effect a shifting process, the shifting actuator is driven until the change lever, by which the shift drum is rotated, comes into contact with the stopper member, and the position of the stopper member with respect to the non-shifting position of the shifting actuator is detected in both directions along the motion path. Thus, the actuator center position is determined. As such, the determination of whether the non-shifting position of the shifting actuator is appropriate can be reliably made. Further, when both the determination of whether the original position of the first engagement portion is appropriate and the determination of whether the non-shifting position of the shifting actuator is appropriate are made, the reliability of determination for ensuring proper shifting processes can be increased.

A transmission-equipped vehicle according to another aspect of the present invention includes: a transmission that changes a speed of rotation produced by rotational power of a power source for travel of the vehicle; a shifting actuator; an automatic shifting power transmission mechanism through which a drive force of the shifting actuator is transmitted to the transmission as shifting power for a shifting process; a change mechanism by which a shift drum is rotated to set a shift fork of the transmission in motion; and a controller that controls the shifting actuator, wherein the change mechanism includes: a change lever that pivots in conjunction with motion of the automatic shifting power transmission mechanism to rotate the shift drum in a stepwise fashion; and a stopper member that is secured to a case of the transmission and that restricts a range over which the change lever is pivotable, the controller is configured to, when the shifting process is effected, execute a detection procedure that detects an actuator center position of the shifting actuator on a motion path of the shifting actuator, and in the detection procedure, the controller drives the shifting actuator from a non-shifting position of the shifting actuator in one direction along the motion path of the shifting actuator and acquires first position information representing a first position where the change lever contacts the stopper member, the controller drives the shifting actuator from the non-shifting position in the other direction along the motion path of the shifting actuator and acquires second position information representing a second position where the change lever contacts the stopper member, the controller calculates the actuator center position of the shifting actuator on the motion path from the acquired first position information and the acquired second position information, and the controller compares the calculated actuator center position to the non-shifting position and determines whether the non-shifting position is within a predetermined range defined based on the actuator center position.

In the above configuration, when the shift drum is actually rotated using the drive force of the shifting actuator to effect a shifting process, the shifting actuator is driven until the change lever, by which the shift drum is rotated, comes into contact with the stopper member, and the distance from the non-shifting position of the shifting actuator to the stopper member is detected in both directions along the motion path. Thus, the actuator center position is determined. As such, the determination of whether the non-shifting position of the shifting actuator is appropriate can be reliably made. Making the determination of whether the non-shifting position of the shifting actuator is appropriate can reliably prevent a shifting process from failing due to improper mounting after maintenance work or due to a change with time when the shifting process is effected using the drive force of the shifting actuator.

With the present invention, when a shifting process is effected using a drive force of a shifting actuator, failure of the shifting process due to improper mounting after maintenance work or due to a change with time can be reliably prevented.

DETAILED DESCRIPTION OF THE EMBODIMENTS

Hereinafter, an exemplary embodiment will be described with reference to the drawings.

Figure 1:
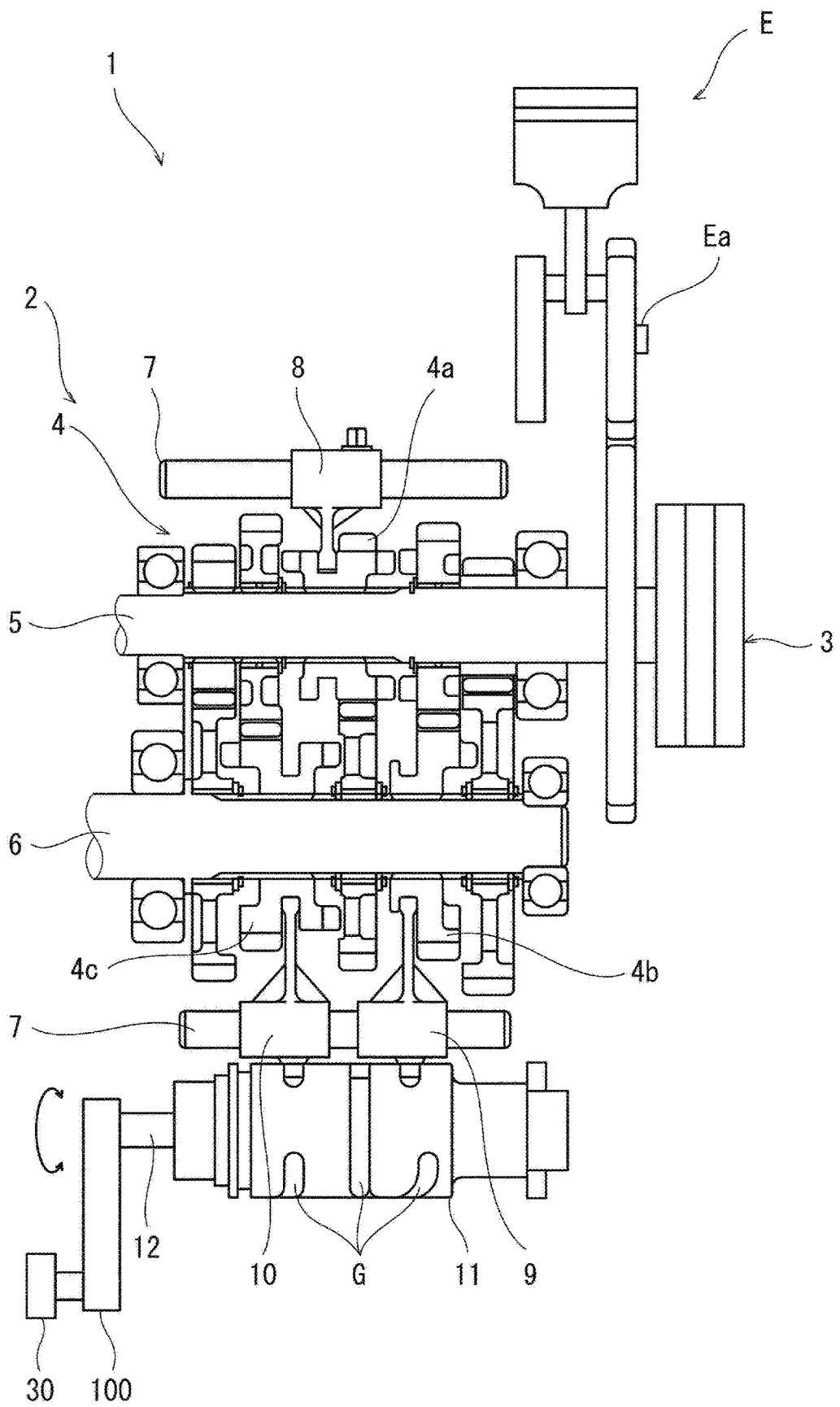
FIG. 1 is a schematic diagram of a transmission-equipped vehicle according to an exemplary embodiment.

FIG. 1 is a schematic diagram of a transmission-equipped vehicle 1 according to the exemplary embodiment. Referring to FIG. 1, the vehicle 1 includes an engine E (power source for travel of the vehicle) which is an internal combustion engine, a transmission 2 which changes the speed of rotation produced by rotational power generated by the engine E, and a main clutch 3 (e.g., multi-disc clutch) disposed between the engine E and the transmission 2. The transmission 2 is configured to transmit power from an input shaft 5 to an output shaft 6 through a plurality of gear trains 4 with different reduction gear ratios and configured to change the speed of rotation with any selected one of the gear trains 4. The transmission 2 is, for example, a dog clutch transmission.

The input shaft 5 of the transmission 2 receives rotational power transmitted from a crankshaft Ea of the engine E. To the output shaft 6 of the transmission 2 is connected a power output mechanism (such as a chain-sprocket mechanism) through which power is transmitted to a drive wheel (not shown). In the transmission 2, shift forks 8 to 10 are slidably supported by a support shaft 7 disposed parallel to the input and output shafts 5 and 6. A first end of the shift fork 8 is connected to a dog gear 4a of the input shaft 5. First ends of the other shift forks 9 and 10 are connected respectively to dog gears 4b and 4c of the output shaft 6.

Second ends of the shift forks 8 to 10 are fitted in guide grooves G of a shift drum 11. Once the shift drum 11 is rotated by actuation power transmitted to a first end of the shift drum 11, the shift forks 8 to 10 guided by the guide grooves G slide the corresponding dog gears 4a to 4c, respectively, along the output shaft 6. As a result, one of the gear trains 4 that has a desired reduction gear ratio is brought into a power transmission state, and a power transmission path at a desired gear position is selected.

Shifting System

Figure 2:
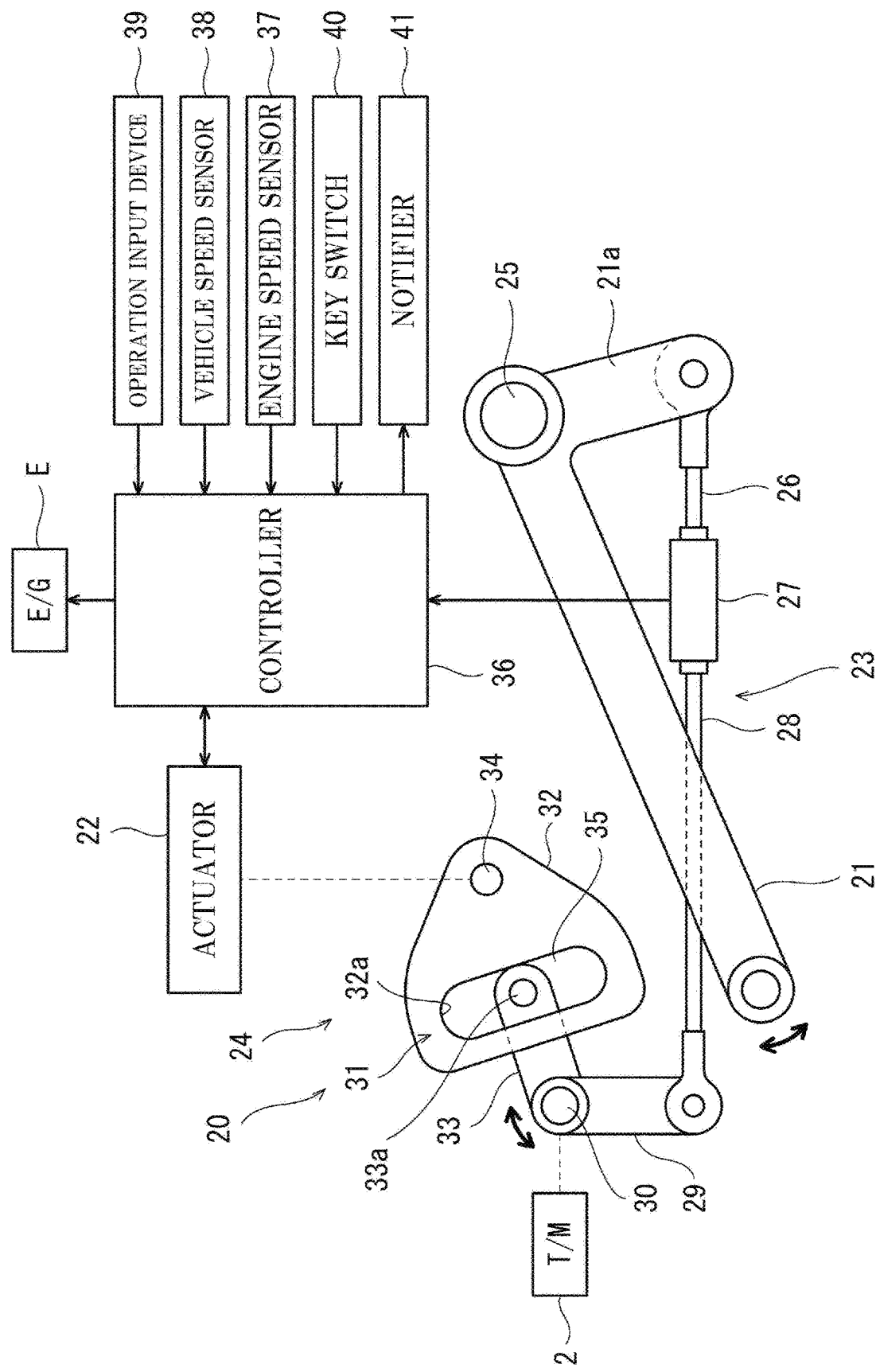
FIG. 2 is a schematic diagram of the operational configuration of a shifting system of the vehicle of FIG. 1.

FIG. 2 is a schematic diagram of the operational configuration of a shifting system 20 of the vehicle 1 of FIG. 1. Referring to FIG. 2, in the shifting system 20, the transmission 2 can be actuated by using an operation force applied by the operator to a shifting operation lever 21 (shifting operation member) as shifting power for a shifting process, and also by using a drive force of a shifting actuator 22 (e.g., an electric motor) as shifting power for a shifting process. In particular, the shift drum 11 (see FIG. 1) is rotated by the operation force applied by the operator to the shifting operation lever 21 and is rotated also by the drive force of the shifting actuator 22.

The shifting system 20 includes: a manual shifting power transmission mechanism 23 through which the operation force applied by the operator to the shifting operation lever 21 is transmitted to the shift drum 11 (see FIG. 1) of the transmission 2; and an automatic shifting power transmission mechanism 24 through which the driver force of the shifting actuator 22 is transmitted to the manual shifting power transmission mechanism 23. The manual shifting power transmission mechanism 23 mechanically connects the shifting operation lever 21 to the first end of the shift drum 11. The shifting operation lever 21 is operated by the operator (e.g., a foot of the operator), and pivots about a pivot shaft 25. The manual shifting power transmission mechanism 23 includes a first rod 26, a load sensor 27 (shifting process detector), a second rod 28, a pivot arm 29, and a rotary member 30.

A first end of the first rod 26 is connected to a pivot portion 21a integrated with the shifting operation lever 21. Upon operation of the shift operation lever 21, the pivot portion 21a pivots about the pivot shaft 25. The second rod 28 is coaxially aligned with the first rod 26. A second end of the first rod 26 and a first end of the second rod 28 are connected to each other via the load sensor 27 (shifting process detector). A second end of the second rod 28 is coupled to a first end of the pivot arm 29. A second end of the pivot arm 29 is secured to the rotary member 30. The rotary member 30 is coupled to a support shaft 12 of the shift drum 11 via a change mechanism 100 described later, and the shift drum 11 is rotatable in conjunction with rotation of the rotary member 30.

Once the shifting operation lever 21 is operated in one direction, the rotary member 30 is rotated in one direction by the operation force transmitted through the first rod 26, the load sensor 27, the second rod 28, and the pivot arm 29, and thus the shift drum 11 is rotated to effect an upshifting process. Once the shift operation lever 21 is operated in an opposite direction, the rotary member 30 is rotated in an opposite direction, and thus the shift drum 11 is rotated to effect a downshifting process.

The automatic shifting power transmission mechanism 24 includes a unidirectional transmitting part 31 disposed between the shifting actuator 22 and the rotary member 30. The unidirectional transmitting part 31 permits transmission of a rotational drive force of the shifting actuator 22 to the rotary member 30. When the manual shifting power transmission mechanism 23 is set in motion upon operation of the shifting operation lever 21, the unidirectional transmitting part 31 blocks transmission of the motion of the manual shifting power transmission mechanism 23 to the shifting actuator 22.

Specifically, the unidirectional transmitting part 31 includes a first engagement member 32 and a second engagement member 33. The first engagement member 32 includes a first engagement portion 32a and moves in conjunction with the motion of the shifting actuator 22. For example, the first engagement member 32 is a plate member rotated by the shifting actuator 22 about a rotational shaft 34, and the first engagement portion 32a is an elongated engagement hole formed in the first engagement member 32. The second engagement member 33 includes a second engagement portion 33a engageable with the first engagement portion 32a and moves in conjunction with the motion of the manual shifting power transmission mechanism 23 (in particular, the rotary member 30). For example, the second engagement member 33 is an arm member projecting from the rotary member 30, and the second engagement portion 33a is an engagement pin extending from the distal end of the second engagement member 33 and inserted in the first engagement portion 32a formed as the engagement hole.

In the present embodiment, one of the members constituting the unidirectional transmitting part 31 that moves in conjunction with the motion of the shifting actuator 22 is referred to as "first engagement member 32", while the member that moves in conjunction with the motion of the manual shifting power transmission mechanism 23 is referred to as "second engagement member 33". There is no particular limitation on the motional master-slave relationship (or male-female relationship) between the first engagement portion 32a of the first engagement member 32 and the second engagement portion 33a of the second engagement member 33. That is, while in the present embodiment an elongated engagement hole is presented as an example of the first engagement portion 32a and an engagement pin inserted in the engagement hole is presented as an example of the second engagement portion 33a, the second engagement portion 33a may be an elongated engagement hole and the first engagement portion 32a may be an engagement pin inserted in the engagement hole. The same applies to variants described later (FIGS. 7 and 9 to 11).

The unidirectional transmitting part 31 includes a play portion 35 formed between the first engagement portion 32a and the second engagement portion 33a on a relative motion path along which the second engagement member 33 moves relative to the first engagement member 32 in conjunction with the motion of the manual shifting power transmission mechanism 23. The play portion 35 is formed in a region containing the entire range over which the second engagement portion 33a is movable in conjunction with the motion of the manual shifting power transmission mechanism 23. Thus, when the transmission 2 is manually shifted through operation of the shifting operation lever 21, the second engagement portion 33a of the second engagement member 33 rotating in conjunction with rotation of the rotary member 30 undergoes a displacement (lost motion) within the play portion 35 and does not interfere with the first engagement member 32. That is, transmission of power from the manual shifting power transmission mechanism 23 is cut off by the play portion 35, so that transmission of the power to the shifting actuator 22 through the first engagement member 32 is blocked. As such, the operator operating the shifting operation lever 21 can be prevented from receiving mechanical resistance caused by the shifting actuator 22.

When the transmission 2 is automatically shifted by a drive force of the shifting actuator 22, the rotational shaft 34 is rotated by the shifting actuator 22 to cause the first engagement member 32 to pivot until the first engagement portion 32a comes into contact with the second engagement portion 33a. Thereafter, the first engagement member 32 further pivots under the action of the shifting actuator 22, so that the second engagement portion 33a is pushed by the first engagement portion 32a. Consequently, the rotary member 30 and therefore the shift drum 11 rotate, thus accomplishing the automatic shifting. In the above process, the shifting actuator 22 may be controlled to temporarily reduce the rotational speed of the rotational shaft 34 immediately before the first engagement portion 32a comes into contact with the second engagement portion 33a. Upon completion of the shifting process effected by the shifting actuator 22, the shifting actuator 22 is controlled to return the second engagement portion 33a to the center of the hole of the first engagement member 32 on the motion path of the second engagement portion 33a. To this end, the original position of the shifting actuator 22, where the shifting actuator 22 is placed during non-shifting periods (periods where any shifting process does not take place), is stored in a storage medium described later (the original position is represented, for example, by the rotational angle θ of the rotational shaft 34). Upon completion of the shifting process, the shifting actuator 22 is controlled to return to the original position.

The shifting system 20 includes a controller 36 (control unit), an engine speed sensor 37, a vehicle speed sensor 38, and an operation input device 39. The controller 36 includes a processor, a volatile memory, a non-volatile memory (storage medium), and an I/O interface. The processor executes processing procedures using the volatile memory according to programs stored in the non-volatile memory, thus accomplishing various types of control. The controller 36 controls the engine E and the shifting actuator 22. The engine speed sensor 37 detects the rotational speed of the crankshaft Ea of the engine E. The vehicle speed sensor 38 detects the traveling speed of the vehicle 1. The vehicle speed sensor 38 is, for example, a sensor that detects the rotational speed of the driven wheel. The operation input device 39 is operated by the operator (e.g., by a hand of the operator). The operation input device 39 is, for example, an input button or an input lever.

If the load sensor 27 detects the start of a shifting process effected using the shifting operation lever 21 while the engine E is determined to be accelerating based on a detection signal of the engine speed sensor 37, the controller 36 corrects a command value given to the engine E so that the engine E is decelerated (for example, the ignition is temporarily stopped or the throttle valve opening degree is temporarily reduced). That is, the load sensor 27 serves as a shifting process detector that detects a shifting process effected using the shifting operation lever 21. If the load sensor 27 detects the start of a shifting process effected using the shifting operation lever 21 while the engine E is determined to be decelerating based on a detection signal of the engine speed sensor 37, the controller 36 corrects the command value given to the engine E so that the engine E is accelerated (for example, the throttle valve opening degree is temporarily increased).

According to the control described above, when the shifting operation lever 21 is operated to effect a shifting process, the currently engaged dog gear among the dog gears 4a to 4c (see FIG. 1) of the transmission 2 is temporarily relieved of the load applied in the rotational direction, and for this reason the dog clutch can be set in motion without cutting off power transmission between the engine E and the transmission 2. Thus, the operator can easily and quickly perform a shifting operation merely by operating the shifting operation lever 21 without operating the main clutch 3.

The operation force applied by the operator to the shifting operation lever 21, which acts as shifting power for a shifting process, is transmitted to the shift drum 11 of the transmission 2 through the manual shifting power transmission mechanism 23. Thus, the operator can receive a reaction force from the transmission 2. As such, in the vehicle 1 having both the manual shifting function and the automatic shifting function, the operator can enjoy the good feeling of freely maneuvering the vehicle during manual shifting. This improves the operational feeling of the operator.

At least one of the case where the operator provides a shifting input to the operation input device 39 and the case where the vehicle speed detected by the vehicle speed sensor 38 satisfies a predetermined condition, the controller 36 issues a shifting command to the shifting actuator 22. When issuing the shifting command to the shifting actuator 22 while the engine E is determined to be accelerating based on a detection signal of the engine speed sensor 37, the controller 36 corrects the command value given to the engine E so that the engine E is decelerated (for example, the ignition is temporarily stopped or the throttle valve opening degree is temporarily reduced). That is, by detecting the issuance of a command to the shifting actuator 22, the controller 36 serves as a shifting process detector that detects a shifting process effected using the shifting actuator 22.

If the issuance of the shifting command to the shifting actuator 22 is detected while the engine E is determined to be decelerating based on a detection signal of the engine speed sensor 37, the controller 36 corrects the command value given to the engine E so that the engine E is accelerated (for example, the throttle valve opening degree is temporarily increased). The vehicle 1 may be equipped with only one of the vehicle speed sensor 38 and the operation input device 39.

First Detection Procedure

As stated above, when the transmission 2 is manually shifted through operation of the shifting operation lever 21, the second engagement portion 33a of the second engagement member 33 rotating in conjunction with rotation of the rotary member 30 undergoes a displacement (lost motion) within the play portion 35 and does not interfere with the first engagement member 32. When the transmission 2 is automatically shifted by a drive force of the shifting actuator 22, the first engagement member 32 pivots under the action of the shifting actuator 22, and accordingly the second engagement portion 33a is pushed by the first engagement portion 32a, so that the rotary member 30 and therefore the shift drum 11 rotate. In order that these processes may be reliably accomplished, the position of the second engagement portion 33a needs to be in the vicinity of the center position of the first engagement portion 32a (the center of the engagement hole on the relative motion path) during non-shifting periods. In other words, the original position of the first engagement portion 32a on the relative motion path (the position where the first engagement portion 32a is placed during non-shifting periods) needs to be within a predetermined range defined based on the center position on the relative motion path.

Thus, the controller 36 is configured to, during a predetermined non-shifting period, execute a first detection procedure that detects the center position of the first engagement portion 32a on the relative motion path.

Figure 3:
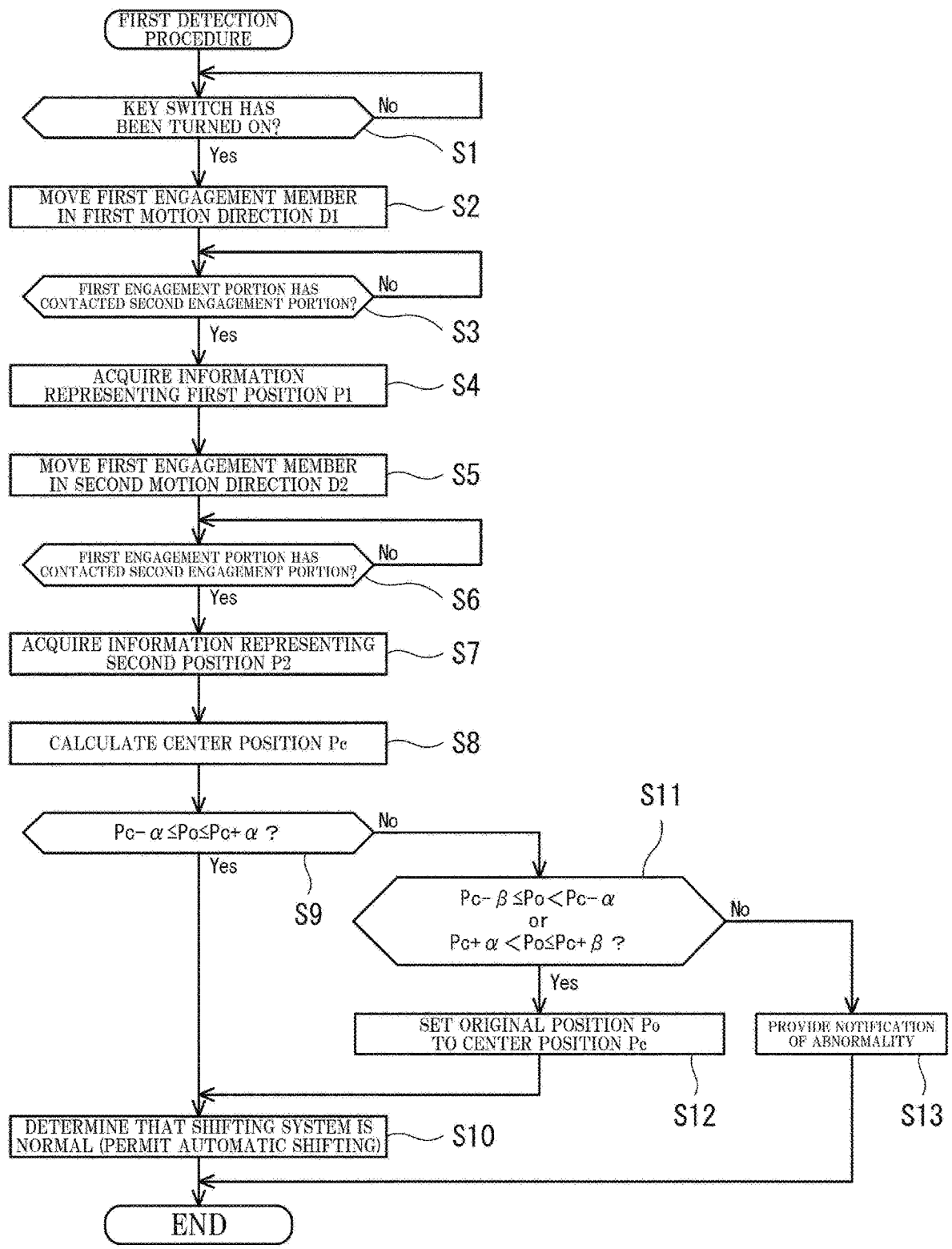
FIG. 3 is a flowchart illustrating a first detection procedure in the exemplary embodiment.

FIG. 3 is a flowchart illustrating the first detection procedure in the present embodiment. The position of the first engagement portion 32a during non-shifting periods (the original position) is stored in the storage medium of the controller 36. As mentioned above, the original position Po of the first engagement portion 32a is represented, for example, by the rotational angle θo of the rotational shaft 34 as observed when the shifting actuator 22 is in a non-shifting position (position where the shifting actuator 22 is placed during the non-shifting period).

In the present embodiment, the predetermined non-shifting period where the first detection procedure is executed is set as a period where the key switch 40 is turned on. That is, the controller 36 determines whether the key switch 40 has been turned on (step S1) and, upon determining that the key switch 40 has been turned on (Yes in step S1), the controller 36 starts the first detection procedure. The key switch 40 is incorporated in a cylinder lock (not shown) and configured as a switch for turning on/off an auxiliary machine battery (not shown).

The conditions for execution of the first detection procedure include a condition that the shifting operation lever 21 is in a non-operative position (neutral position) and a condition that the transmission 2 is in a neutral position. Once any of these conditions becomes unsatisfied during the first detection procedure, the first detection procedure is stopped. The conditions for execution of the first detection procedure may further include a condition that the engine E is at rest.

In the first detection procedure, the controller 36 drives the shifting actuator 22 to move the first engagement member 32 from the original position Po of the first engagement portion 32a in one direction (first motion direction D1) on the relative motion path (step S2). The original position Po of the first engagement portion 32a corresponds to the non-shifting position (rotational angle θo) of the shifting actuator 22. The controller 36 determines whether the first engagement portion 32a has contacted the second engagement portion 33a (step S3). Upon determining that the first engagement portion 32a has contacted the second engagement portion 33a (Yes in step S3), the controller 36 acquires information representing the position where the contact has been made (step S4). This information is first position information representing a first position P1.

Figure 4:
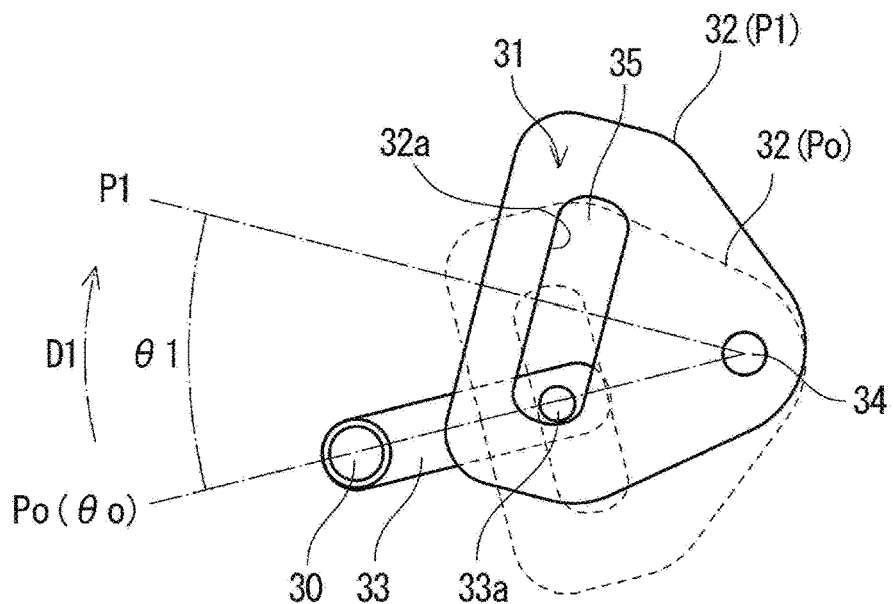
FIG. 4 illustrates the positional relationship between a first engagement member and a second engagement member as observed when the first engagement member has reached a first position in the exemplary embodiment.

FIG. 4 illustrates the positional relationship between the first and second engagement members 32 and 33 as observed when the first engagement member 32 has reached the first position P1 in the present embodiment. In FIG. 4, the first position P1 is indicated by an auxiliary line drawn from the rotational shaft 34 of the first engagement member 32 and perpendicularly bisecting the first engagement portion 32a.

In the first detection procedure, the controller 36 controls the drive force of the shifting actuator 22 to a drive force for detection which is small enough not to set the manual shifting power transmission mechanism 23 in motion. In the present embodiment, the controller 36 performs PWM control of the drive force of the shifting actuator 22. In shifting processes, the controller 36 sets the duty cycle of the PWM control to a first duty cycle (e.g., 100%). In the first detection procedure, the controller 36 sets the duty cycle of the PWM control to a second duty cycle lower than the first duty cycle. The second duty cycle is set to a value (e.g., 25%) at which the drive force generated is so small that the second engagement portion 33a is not moved by contact of the first engagement portion 32a with the second engagement portion 33a. The second duty cycle is preset as a value at which the manual shifting power transmission mechanism 23 is not set in motion, and the presetting of the second duty cycle is made depending on the type of the vehicle. Thus, when the first engagement member 32 is moved by a drive force generated by the shifting actuator 22 based on the second duty cycle, the first engagement member 32 comes to a stop at the position where the first engagement portion 32a contacts the second engagement portion 33a.

The controller 36 determines the first position P1 as the position where, when the shifting actuator 22 is driven by the drive force for detection as described above, the first engagement portion 32a moved in the first motion direction D1 by the drive force for detection comes to a stop. At this time, the controller 36 acquires information (first rotational angle $\theta 1 > \theta o$) representing the first position P1. The first rotational angle $\theta 1$ is detected by a rotational angle sensor, such as a rotary encoder, which detects the rotational angle $\theta$ of the rotational shaft 34. When, as described above, the drive force of the shifting actuator 22 is subjected to PWM control and the duty cycle of the PWM control is set lower in the detection procedure than in shifting processes, it is easy to achieve the adjustment of the drive force of the shifting actuator 22 to the drive force for detection which is small enough not to set the manual shifting power transmission mechanism 23 in motion.

After acquiring the information representing the first position P1, the controller 36 returns the first engagement portion 32a to the original position Po, and then drives the shifting actuator 22 again to move the first engagement member 32 from the original position Po in the other direction (second motion direction D2) along the relative motion path (step S5). The controller 36 determines whether the first engagement portion 32a has contacted the second engagement portion 33a (step S6). Upon determining that the first engagement portion 32a has contacted the second engagement portion 33a (Yes in step S6), the controller 36 acquires information representing the position where the contact has been made (step S7). This information is second position information representing a second position P2.

Figure 5:
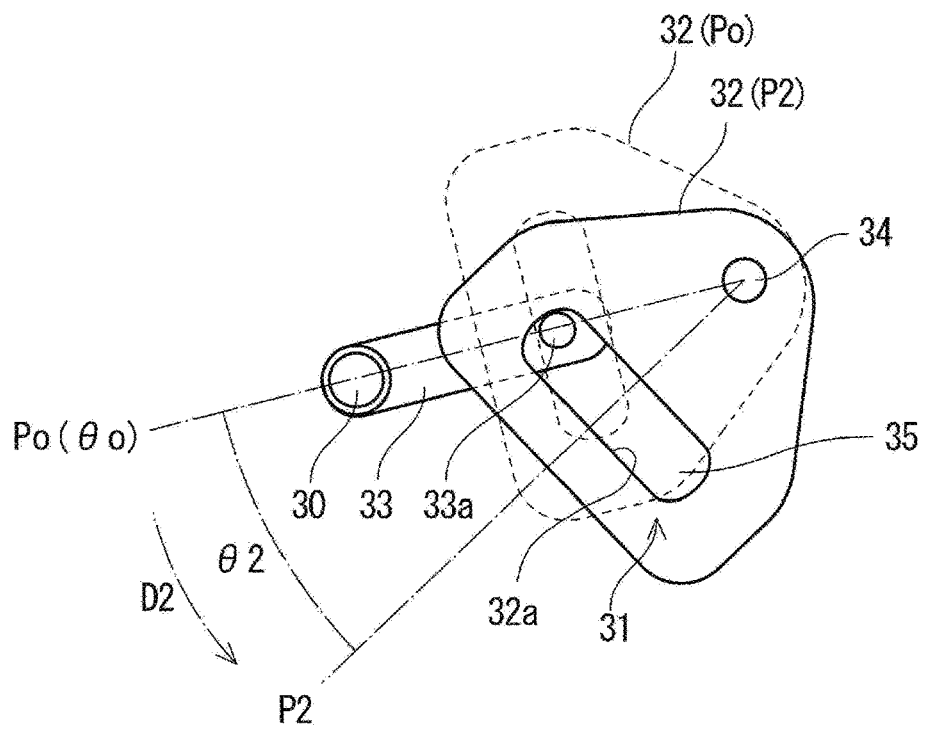
FIG. 5 illustrates the positional relationship between the first and second engagement members as observed when the first engagement member has reached a second position in the exemplary embodiment.

FIG. 5 illustrates the positional relationship between the first and second engagement members 32 and 33 as observed when the first engagement member 32 has reached the second position P2 in the present embodiment. In FIG. 5, the second position P2 is indicated by an auxiliary line drawn from the rotational shaft 34 of the first engagement member 32 and perpendicularly bisecting the first engagement portion 32a.

When acquiring the information representing the second position P2, as in the acquisition of the information representing the first position P1, the controller 36 causes the shifting actuator 22 to generate the driver power for detection as described above, and determines the second position P2 as the position where the first engagement portion 32a moved by the drive force for detection in the second motion direction D2 comes to a stop. At this time, the controller 36 acquires information (second rotational angle $\theta 2 < \theta o$) representing the second position P2.

The controller 36 repeats steps S2 to S7 a predetermined number of times, and acquires the value representing the first position P1 and the value representing the second position P2 in each repetition. The controller 36 calculates the average of the predetermined number of values representing the first position P1 and the average of the predetermined number of values representing the second position P2 and handles these averages as the information representing the first position P1 and the information representing the second position P2, respectively. Alternatively, the controller 36 may repeat the steps of acquiring the information representing the first position P1 (steps S2 to S4) a predetermined number of times, and then repeat the steps of acquiring the information representing the second position P2 (steps S5 to S7) a predetermined number of times.

The controller 36 calculates the center position of the first engagement portion 32a on the motion path from the information representing the first position P1 and the information representing the second position P2 which are acquired as described above (step S8). For example, when the first rotational angle θ1 (>θo) and the second rotational angle θ2 (<θo) are acquired as described above, the controller 36 calculates a rotational angle θc (=θ1+θ2)/2) representing a center position Pc.

The controller 36 compares the calculated center position Pc to the original position Po and determines whether the original position Po is within a predetermined first range defined based on the center position Pc (step S9). For example, the controller 36 determines whether the original position Po is within ±α of the center position Pc, namely whether the original position Po is equal to or greater than Pc−α and equal to or smaller than Pc+α. For example, the controller 36 determines whether the rotational angle θo representing the original position Po is within ±6° of the rotational angle θc representing the center position Pc.

If the original position Po is determined to be within the first range (Yes in step S9), the controller 36 determines that the original position Po is an appropriate one, and ends the first detection procedure. In this case, the original position Po is not changed. The controller 36 determines that the shifting system is normal, and permits automatic shifting to be effected using the shifting actuator 22 (step S10).

If the original position Po is outside the first range (No in step S9), the controller 36 determines whether the original position Po is within a second range wider than the first range (step S11). For example, the controller 36 determines whether the original position Po is within ±β of the center position Pc (β>α), namely whether the original position Po is equal to or grater than Pc−β and smaller than Pc−α or is greater than Pc+α and equal to or smaller than Pc+β.

If the original position Po is outside the first range and within the second range wider than the first range (Yes in step S11), the controller 36 updates the non-shifting position of the shifting actuator 22 such that the calculated center position Pc is set as the original position Po (step S12). After the updating, the controller 36 permits automatic shifting to be effected using the shifting actuator 22 (step S10).

If the original position Po is outside the second range (No in step S11), the controller 36 determines that the shifting system is in an abnormal state where the original position Po is uncorrectable, and causes the notifier 41 to provide a notification of the abnormality (step S13). The notifier 41 may be, for example, a lamp, monitor, or buzzer mounted at a given location on the vehicle 1. After determining that the shifting system is in an abnormal state, the controller 36 prevents the shifting actuator 22 from being set in motion and prohibits automatic shifting effected using the shifting actuator 22.

In the above configuration, during the non-shifting period, the shifting actuator 22 is driven until the first engagement portion 32a comes into contact with the second engagement portion 33a, and the positions of the first engagement portion 32a at both ends of the relative motion path are detected with respect to the original position of the first engagement portion 32a. Thus, the center position Pc of the first engagement portion 32a on the relative motion path can be determined. As such, the determination of whether the original position Po of the first engagement portion 32a on the relative motion path is appropriate can be reliably made without setting the transmission 2 and the shifting operation lever 21 in motion, in order to define the amount of play provided in the unidirectional transmitting part 31 to cut off transmission of the motion of the manual shifting power transmission mechanism 23 to the shifting actuator 22. Making the determination of whether the original position Po of the first engagement portion 32a is appropriate can reliably prevent a shifting process from failing due to improper mounting after maintenance work or due to a change with time when the shifting process is effected using the drive force of the shifting actuator 22.

When the original position Po of the first engagement portion 32a is outside the first range which is defined as a reference for determining whether resetting of the original position Po is needed, and within the second range which is defined as a reference for determining the presence or absence of abnormality, the original position Po of the first engagement portion 32a is reset to the calculated center position Pc. Further, when the original position Po of the first engagement portion 32a is outside the second range which is defined as a reference for determining the presence or absence of abnormality, a notification of abnormality is provided, and automatic shifting is prohibited. Thus, when the original position Po of the first engagement portion 32a is within a range where the original position Po is resettable, the original position Po can be reset to prevent the occurrence of abnormality of the automatic shifting function. When the original position Po of the first engagement portion 32a is in a range where the original position Po is not resettable, a notification of abnormality can be provided to inform the operator of the abnormality of the automatic shifting function before a shifting process is actually effected.

In the above configuration, during the first detection procedure, the drive force of the shifting actuator 22 is restricted, and the first engagement member 32 is moved by the restricted drive force for detection. Thus, even though the shifting actuator 22 is driven, the manual shifting power transmission mechanism 23 is not set in motion because of the smallness of the drive force. This makes it easy to ensure that the determination of whether the original position Po of the first engagement portion 32a is appropriate is made without setting the transmission 2 and the shifting operation lever 21 in motion. Further, by virtue of the restriction of the drive force of the shifting actuator 22, the first engagement portion 32a comes to a stop upon contacting the second engagement portion 33a. As such, the contact of the first engagement portion 32a with the second engagement portion 33a can easily be detected.

In the above configuration, the first detection procedure is started once the key switch 40 is turned on. Thus, the determination as to the original position Po can be made before the vehicle 1 begins to travel. This ensures that the determination as to the original position Po is made before a shifting process is actually effected.

The present embodiment is an example where when the original position Po is outside the first range and within the second range, the controller 36 resets the original position Po and where when the original position Po is outside the second range, the controller 36 operates to provide a notification of abnormality. Alternatively, when the original position Po is outside the first range, at least one (or only one) of the resetting of the original position Po and the provision of a notification of abnormality may be performed. The first range is defined as appropriate according to the manner of control.

In the present embodiment, in detection of the first and second positions P1 and P2, the drive force of the shifting actuator 22 is restricted by making the duty cycle smaller than that used during shifting, and thus the first engagement member 32 comes to a stop upon contact of the first engagement portion 32a with the second engagement portion 33a. However, the manner of detection of the first and second positions P1 and P2 is not limited to that in the present embodiment. For example, the voltage applied to the shifting actuator 22 may be reduced to restrict the drive force of the shifting actuator 22.

The drive force of the shifting actuator 22 need not necessarily be restricted. For example, the current flowing through the shifting actuator 22 may be detected, and the first and second positions P1 and P2 may be detected based on an increase in current which occurs when the first engagement portion 32a comes into contact with the second engagement portion 33a and the load imposed on the shifting actuator 22 is increased due to this contact. Alternatively, the elapsed time to the contact of the first engagement portion 32a with the second engagement portion 33a may be measured instead of the rotational angle of the rotational shaft 34 of the shifting actuator 22, and the center position Pc may be calculated based on the measured time.

Second Detection Procedure

The controller 36 may execute a second detection procedure in addition to or instead of the first detection procedure. The controller 36 may be configured to, when, for example, a shifting process is effected during travel of the vehicle, execute the second detection procedure that detects a center position of the shifting actuator 22 (actuator center position) on the motion path of the shifting actuator 22.

Figure 6:
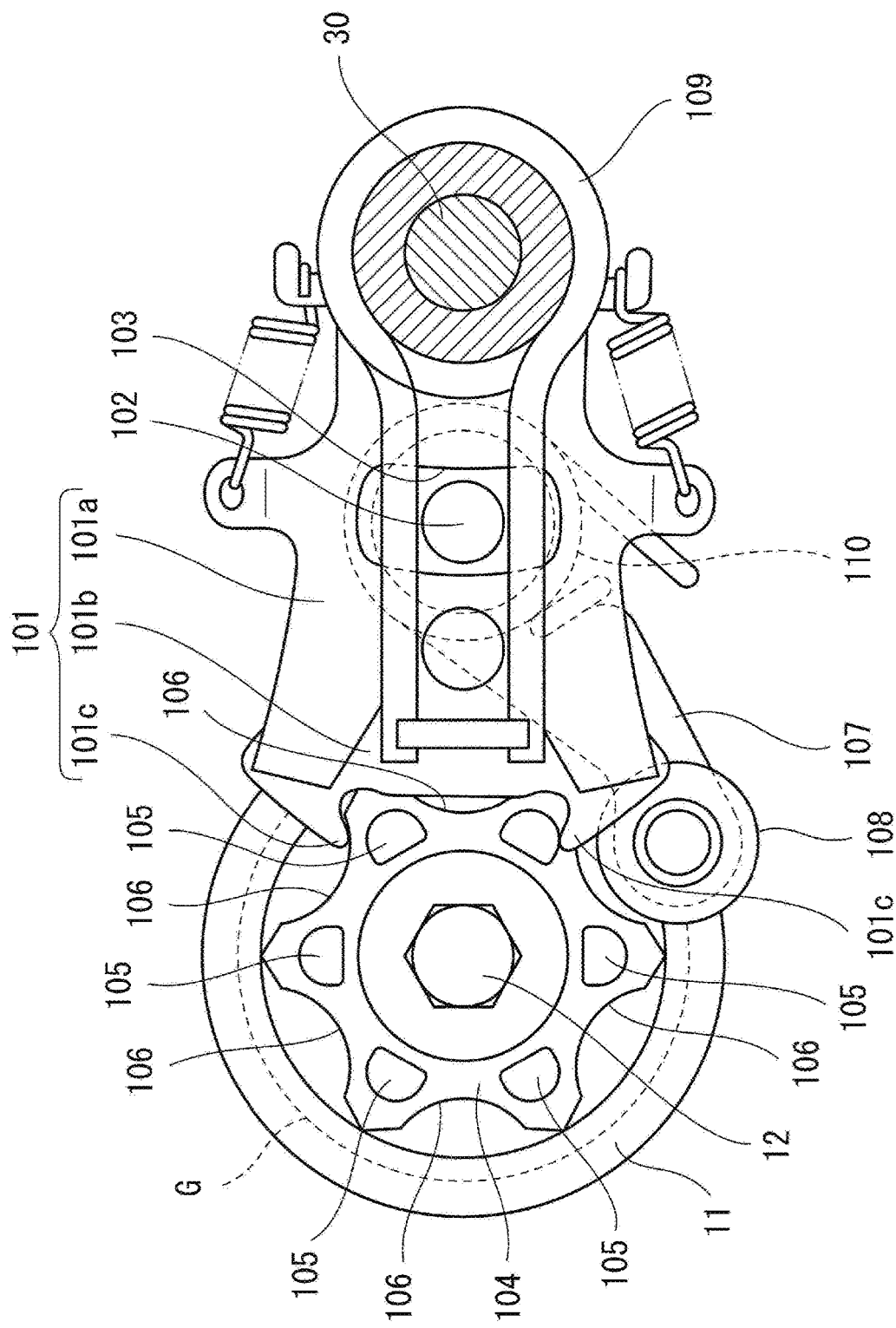
FIG. 6 illustrates a change mechanism by which a shift drum is rotated in the exemplary embodiment.

First, a change mechanism 100 used in the second detection procedure will be described. FIG. 6 illustrates the change mechanism 100 by which the shift drum 11 is rotated in the present embodiment. The vehicle 1 includes the change mechanism 100 by which the shift drum 11 is rotated to set the shift forks 8 to 10 of the transmission 2 in motion. The change mechanism 100 includes: a change lever 101 that pivots in conjunction with the motion of the manual shifting power transmission mechanism 23 to rotate the shift drum 11 in a stepwise fashion; and a stopper member 102 that is secured to a case (not shown) of the transmission 2 and that restricts the range over which the change lever 101 is pivotable.

The change lever 101 includes a change lever body 101a, a slide plate 101b, and a pair of shift claws 101c. The change lever body 101a is secured to the rotary member 30 and pivots in conjunction with rotation of the rotary member 30. The change lever body 101a is provided with an elongated hole 103 extending longitudinally along the direction of pivotal movement about the rotary member 30. The stopper member 102 in the form of a rod is loosely fitted in the elongated hole 103. Thus, the pivotal movement of the change lever 101 is restricted by the stopper member 102 within a given range. The change lever 101 is biased by means such as a return spring 109 wound around the rotary member 30 such that the stopper member 102 is located at the position of the center of the elongated hole 103 in the direction of pivotal movement about the rotary member 30.

The slide plate 101b is slidable relative to the change lever body 101a in the radial direction of the rotary member 30. The pair of shift claws 101c is provided at the distal end of the slide plate 101b.

A change cam 104 is secured to the support shaft 12 of the shift drum 11. The change cam 104 is provided with a plurality of (six) receiving projections 105 arranged at regular intervals in the circumferential direction of the support shaft 12. Arc-shaped positioning recesses 106 are formed between the receiving projections 105 adjacent to one another in the circumferential direction. The change mechanism 100 further includes a position lever 107 pivotable about the central axis of the stopper member 102. The proximal end of the position lever 107 is pivotally supported by the stopper member 102, and a positioning roller 108 is mounted at the distal end of the position lever 107. In non-shifting periods, the positioning roller 108 is fitted in one of the positioning recesses 106 of the change cam 104 under a biasing force applied by a biasing spring 110 in a direction toward the change cam 104.

Once the shifting operation lever 21 is operated in one direction (upshifting operation) or an upshifting operation input is provided through the operation input device 39, the rotary member 30 rotates in one direction, and accordingly the change lever 101 pivots in the one direction. At this time, one of the shift claws 101c that is located behind the other in the direction of pivotal movement is engaged with one of the receiving projections 105 while the other shift claw 101c located ahead is disengaged from the receiving projections 105. Consequently, the change cam 104 and therefore the shift drum 11 rotate in a direction opposite to the direction of the rotation of the rotary member 30. Meanwhile, the position lever 107 pivots about the axis of the stopper member 102, so that the positioning roller 108 is released from the positioning recess 106.

The shift drum 11 rotates by an amount corresponding to one pitch of the change cam 104, and thus the upshifting is completed. As the shift drum 11 rotates by an amount corresponding to one pitch of the change cam 104, one shift claw 101c located behind the other in the direction of pivotal movement is disengaged from the receiving projection 105, and the change lever 101 is returned by the return spring 109 to the biased position (non-shifting position). Meanwhile, the positioning roller 108 skips one receiving projection 105 and is fitted in another of the positioning recesses 106. Thus, the shift drum 11 is held in the position into which the shift drum 11 is placed as a result of the upshifting. A downshifting process takes place in the same manner as the upshifting process, except that the rotational directions of the rotary member 30 and the shift drum 11 are opposite to those in the upshifting process.

The positions where the stopper member 102 contacts the ends of the elongated hole 103 are defined based on the position of the change lever 101 by which the shift drum 11 is rotated by an amount corresponding to one pitch.

In the second detection procedure, the controller 36 drives the shifting actuator 22 to effect a shifting process, thus moving the shifting actuator 22 from the non-shifting position of the shifting actuator 22 in one direction along the motion path of the shifting actuator 22. The controller 36 acquires third position information representing a third position where the shifting actuator 22 is placed when the change lever 101 contacts the stopper member 102 (when the shifting process is actually completed). As in the first detection procedure, the non-shifting position is represented by the rotational angle θo of the rotational shaft 34 of the shifting actuator 22. That is, the non-shifting position of the shifting actuator 22 corresponds to the original position Po of the first engagement portion 32a (first engagement member 32).

The contact of the change lever 101 (in particular, one end of the elongated hole 103) with the stopper member 102 is detected by the fact that the rotary member 30 stops rotating. As in the first detection procedure, the controller 36 acquires a rotational angle (third rotational angle θ3) of the rotational shaft 34 of the shifting actuator 22 as position information (third position information).

Further, the controller 36 drives the shifting actuator 22 to effect a shifting process, thus moving the shifting actuator 22 from the non-shifting position in the other direction along the motion path of the shifting actuator 22. The controller 36 acquires fourth position information (fourth rotational angle θ4) representing a fourth position where the shifting actuator 22 is placed when the change lever 101 contacts the stopper member 102 (when the shifting process is actually completed).

The controller 36 calculates the actuator center position of the shifting actuator 22 on the motion path from the acquired third position information and the acquired fourth position information. The actuator center position of the shifting actuator 22 corresponds to the center position Pc of the first engagement portion 32a (first engagement member 32). The calculation of the actuator center position is performed in the same manner as the center position Pc is calculated in the first detection procedure. The controller 36 compares the calculated actuator center position (the center position Pc of the first engagement portion 32a) to the non-shifting position (the original position Po of the first engagement portion 32a), and determines whether the non-shifting position is within a predetermined third range defined based on the actuator center position. When the original position Po of the first engagement portion 32a is compared to the center position Pc of the first engagement portion 32a, the third range is defined in the same manner as the first range. The first range in the first detection procedure and the third range in the second detection procedure may be different from each other.

In the above configuration, when the shift drum 11 is actually rotated using the drive force of the shifting actuator 22 to effect a shifting process, the shifting actuator 22 is driven until the change lever 101, by which the shift drum 11 is rotated, comes into contact with the stopper member 102, and the position of the stopper member 102 with respect to the non-shifting position of the shifting actuator 22 is detected in both directions along the motion path. Thus, the actuator center position is determined. As such, the determination of whether the non-shifting position of the shifting actuator 22 is appropriate can be reliably made. Further, when both the determination of whether the original position Po of the first engagement portion 32a is appropriate (determination based on the first detection procedure) and the determination of whether the non-shifting position of the shifting actuator 22 is appropriate (determination based on the second detection procedure) are made, the reliability of determination for ensuring proper shifting processes can be increased.

In the second detection procedure, the controller 36 may repeat the acquisition of the third position information and fourth position information a predetermined number of times. In this case, since the second detection procedure is executed during actual shifting processes, the controller 36 counts the number of times of acquisition of the third position information and the number of times of acquisition of the fourth position information after the start of the second detection procedure, and calculates the actuator center position when both the number of times of acquisition of the third position information and the number of times of acquisition of the fourth position information reach or exceed the predetermined number of times.

There is no particular limitation on when the second detection procedure is started. For example, the acquisition of the third position information and fourth position information (or the predetermined number of times of acquisition of the third position information and fourth position information) may be started once the key switch 40 is turned on. Alternatively, for example, the acquisition of the third position information and fourth position information (or the predetermined number of times of acquisition of the third position information and fourth position information) may be started after a predetermined time elapses from the turning on of the key switch 40.

The change mechanism 100 for executing the second detection procedure is not limited to the configuration in the present embodiment (FIG. 6). The change mechanism 100 for executing the second detection procedure may be configured in any manner as long as it includes the change lever 101 which pivots in conjunction with the motion of the manual shifting power transmission mechanism 23 to rotate the shift drum 11 in a stepwise fashion and the stopper member 102 which restricts the range over which the change lever 101 is pivotable.

The present embodiment is an example where the change lever 101 is provided with an elongated hole and where the stopper member 102 is embodied by a pin secured to the case of the transmission 2. Alternatively, the change lever 101 may be provided with a pin, and the stopper member 102 may be embodied by an elongated hole formed in a member secured to the case of the transmission 2. The change lever 101 is not limited to that constituted by three members (101a to 101c) as in the present embodiment, and the number, shape, and other characteristics of the members constituting the change lever 101 may be changed in various ways.

While the present embodiment is an example where the controller 36 executes both the first detection procedure and the second detection procedure, the controller 36 may execute only one of the detection procedures. The second detection procedure is applicable to a transmission-equipped vehicle that does not have manual shifting function (vehicle that does not have the manual shifting power transmission mechanism 23 through which an operation force applied by the operator to the shifting operation lever 21 is transmitted to the transmission 2 as shifting power for a shifting process).

Variants of Shifting System

Figure 7:
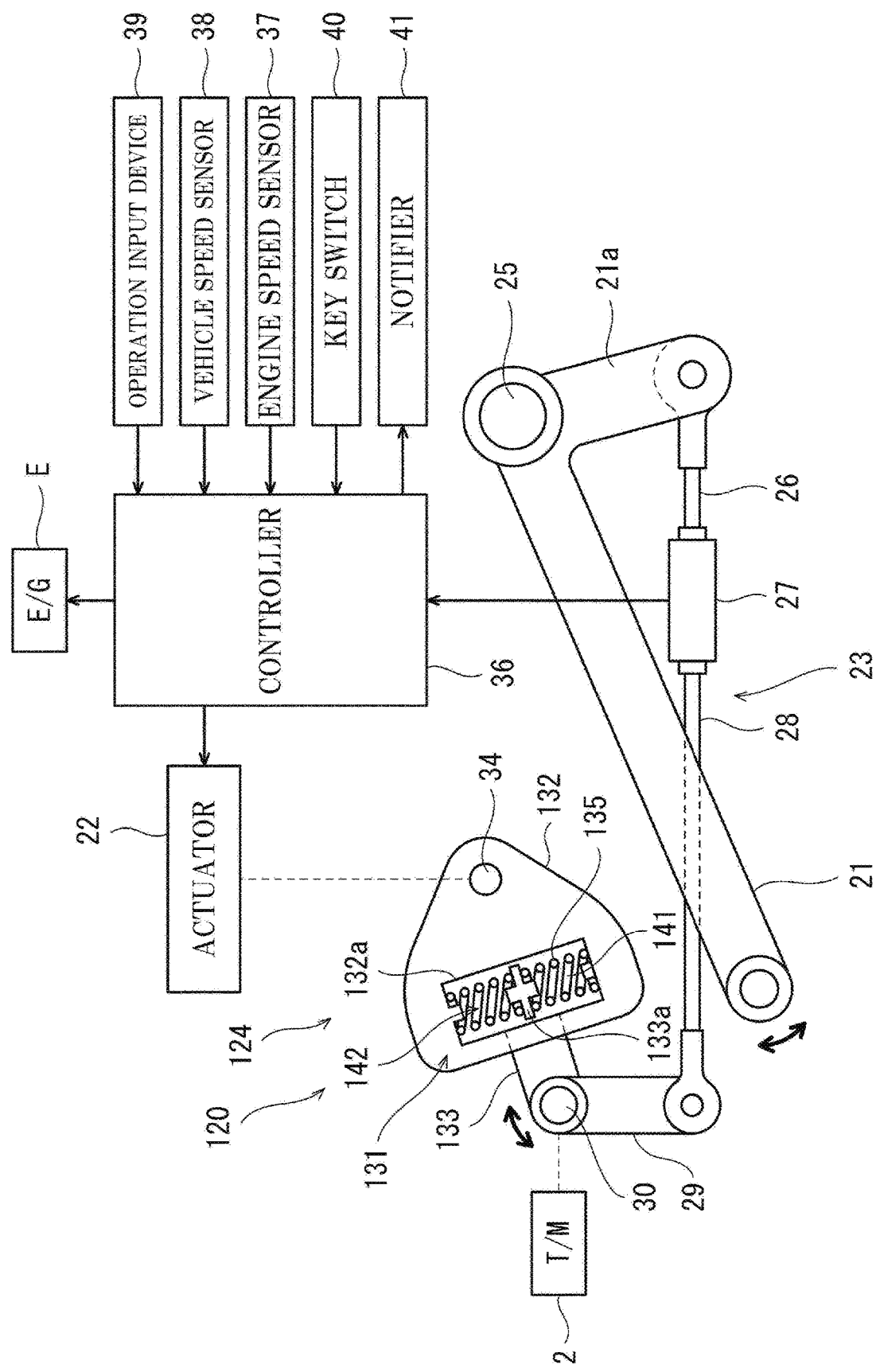
FIG. 7 is a schematic diagram of the operational configuration of a shifting system according to a first variant.
Figure 8:
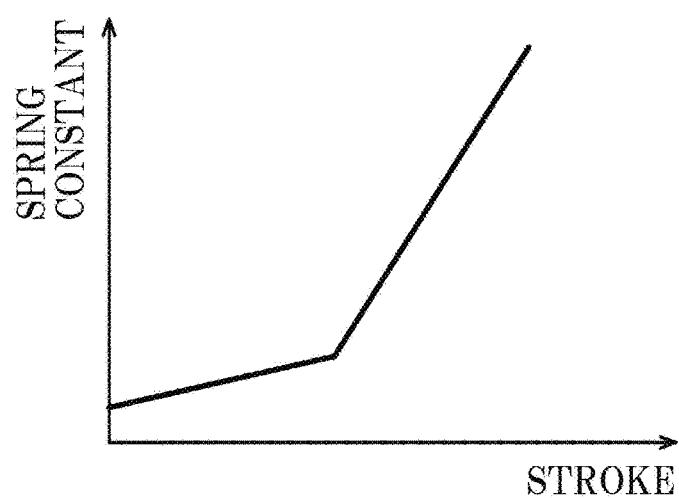
FIG. 8 is a graph showing the spring constant of buffering members shown in FIG. 7.

The following describes other examples of the shifting system to which the first and second detection procedures are applied. FIG. 7 is a schematic diagram of the operational configuration of a shifting system 120 according to a first variant. FIG. 8 is a graph showing the spring constant of spring members 141 and 142 shown in FIG. 7. The elements identical to those of the shifting system 20 of FIG. 2 are denoted by the same reference signs and will not be described repeatedly. In the shifting system 120, as shown in FIG. 7, the spring members 141 and 142 (buffering members) are disposed in a play portion 135 of a unidirectional transmitting part 131 of an automatic shifting power transmission mechanism 124.

A second engagement member 133 movable in conjunction with the motion of the manual shifting power transmission mechanism 23 (in particular, the rotary member 30) has a second engagement portion 133a projecting from the distal end of the second engagement member 133. A first engagement member 132 rotatable by the rotational shaft 34 actuated by the shifting actuator 22 is provided with a first engagement portion 132a which is an engagement hole extending longitudinally in the direction in which the second engagement portion 133a is displaced. The second engagement portion 133a serves also as a spring seat supporting the inner ends of the spring members 141 and 142, and the first engagement portion 132a serves also as a spring seat supporting the outer ends of the spring members 141 and 142. That is, the spring member 141 is located between one longitudinal edge of the first engagement portion 132a and the second engagement portion 133a, and the spring member 142 is located between the other longitudinal edge of the first engagement portion 132a and the second engagement portion 133a. As shown in FIG. 8, the spring members 141 and 142 have a non-linear spring constant which increases as the displacement of the spring members 141 and 142 becomes greater with displacement of the second engagement portion 133a.

In this configuration, when the first engagement member 132 is quickly moved by the shifting actuator 22 and accordingly the second engagement portion 133a and the first engagement portion 132a quickly approach each other to eliminate the play portion 135, the spring members 141 and 142 mitigate a collision impact between the second engagement portion 133a and the first engagement portion 132a. This reduces exposure of the shifting actuator 22 to an impact during automatic shifting, leading to the service life of the shifting actuator 22 being increased. Additionally, since the spring members 141 and 142 have a non-linear spring constant, resistance to motion caused by the spring members 141 and 142 is low in the early stage of a shifting process effected using the shifting actuator 22. Thus, automatic shifting can be quickly accomplished while the impact between the second engagement portion 133a and the first engagement portion 132a is mitigated. The other elements of the shifting system 120 are the same as those of the previously-described shifting system 20 of FIG. 2 and will not be described repeatedly.

Figure 9:
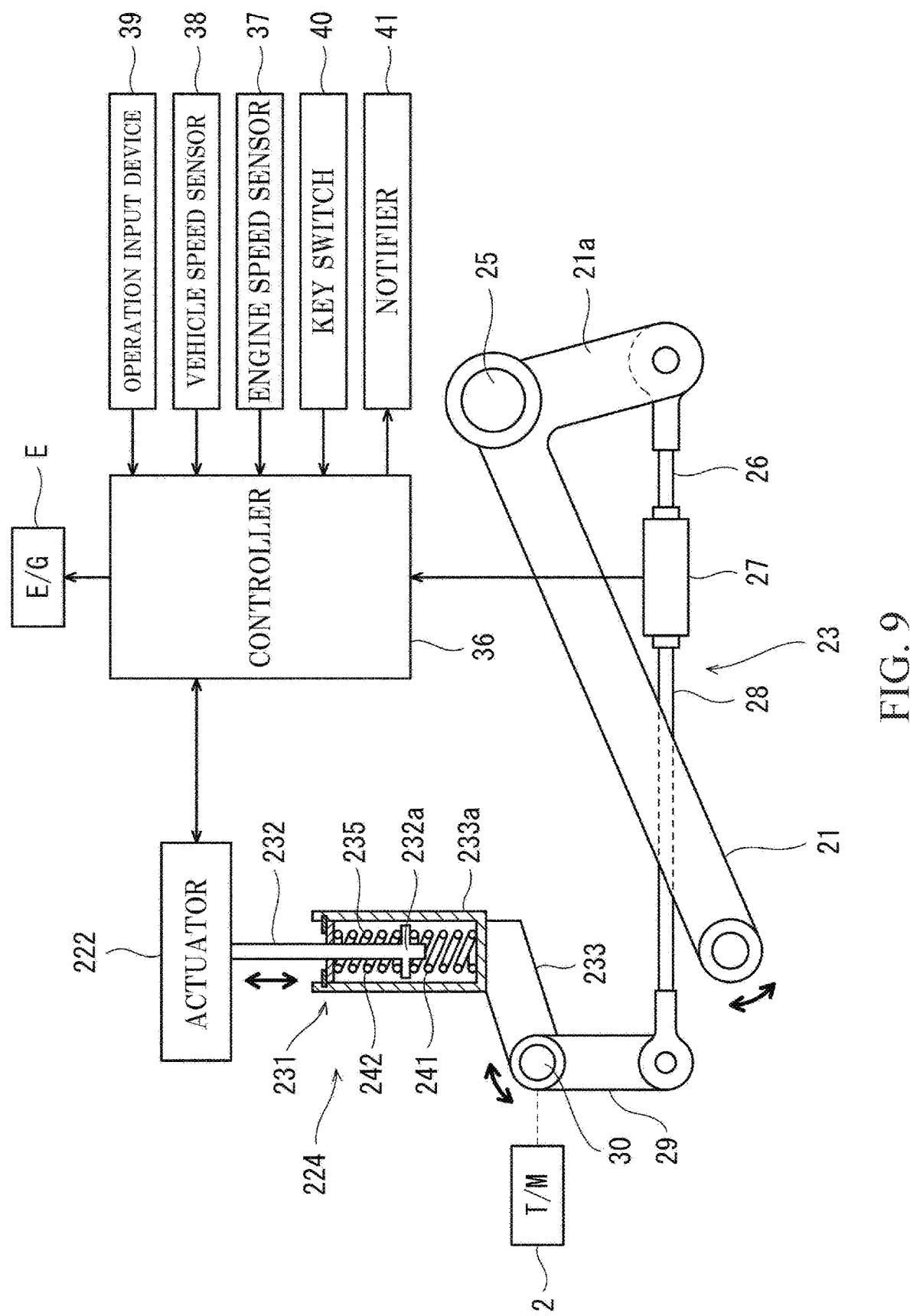
FIG. 9 is a schematic diagram of the operational configuration of a shifting system according to a second variant.

FIG. 9 is a schematic diagram of the operational configuration of a shifting system 220 according to a second variant. In the shifting system 220, as shown in FIG. 9, spring members 241 and 242 (buffering members) are disposed in a play portion 235 of a unidirectional transmitting part 231 of an automatic shifting power transmission mechanism 224. A second engagement member 233 movable in conjunction with the motion of the manual shifting power transmission mechanism 23 has a cylindrical second engagement portion 233a projecting from the distal end of the second engagement member 233. The shifting actuator 222 is a linear motion actuator, and a rod-shaped first engagement member 232 actuated by the shifting actuator 222 is provided with a first engagement portion 232a inserted in the inner space of the second engagement portion 233a.

Thus, the first engagement portion 232a actuated by the shifting actuator 222 can, like a piston, reciprocate in the cylindrical second engagement portion 233a. In the direction of the stroke of the first engagement portion 232a, the spring member 241 is located between one end of the second engagement portion 233a and the first engagement portion 232a, and the spring member 242 is located between the other end of the second engagement portion 233a and the first engagement portion 232a. The other elements of the shifting system 220 are the same as those of the previously-described shifting system 20 of FIG. 2 and will not be described repeatedly.

Figure 10:
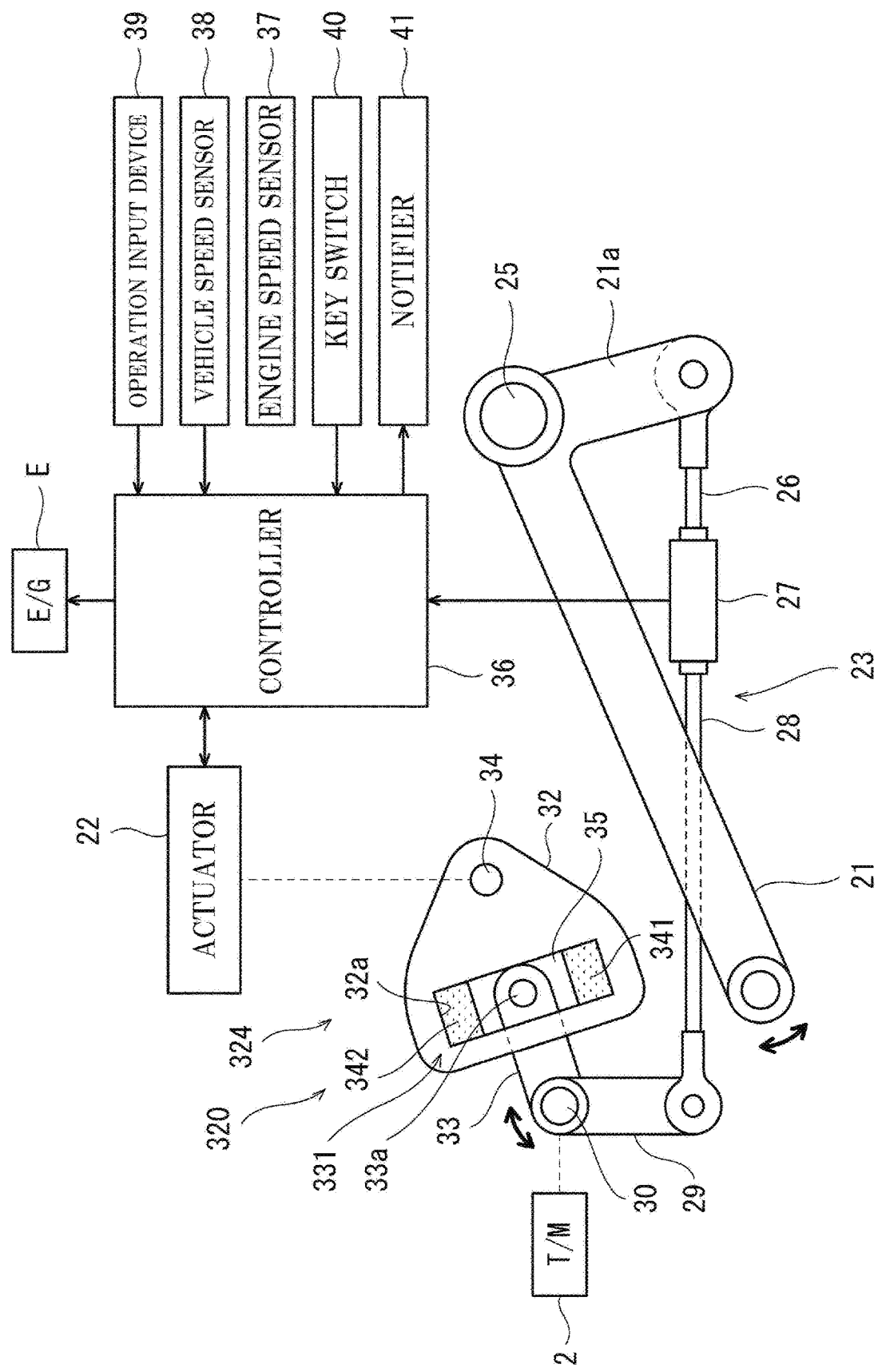
FIG. 10 is a schematic diagram of the operational configuration of a shifting system according to a third variant.

FIG. 10 is a schematic diagram of the operational configuration of a shifting system 320 according to a third variant. The elements identical to those of the shifting system 20 of FIG. 2 are denoted by the same reference signs and will not be described repeatedly. In the shifting system 320, as shown in FIG. 10, flexible members 341 and 342 (buffering members), which may be made of rubber, are disposed in a play portion 35 of a unidirectional transmitting part 331 of an automatic shifting power transmission mechanism 324. Also in this configuration, when the first engagement member 32 is quickly moved by the shifting actuator 22 and accordingly the second engagement portion 33a and the first engagement portion 32a quickly approach each other, the flexible members 341 and 342 mitigate a collision impact between the second engagement portion 33a and the first engagement portion 32a.

When the shifting operation lever 21 is in a non-operative position (neutral position) and the shifting actuator 22 is in a non-actuating state, the flexible members 341 and 342 are spaced from the second engagement portion 33a. Thus, in the early stage of a shifting process effected using the shifting actuator 22, resistance to motion is not caused by the flexible members 341 and 342. As such, automatic shifting can be quickly accomplished while the impact between the second engagement portion 33a and the first engagement portion 32a is mitigated. The other elements of the shifting system 320 are the same as those of the previously-described shifting system 20 of FIG. 2 and will not be described repeatedly.

Figure 11:
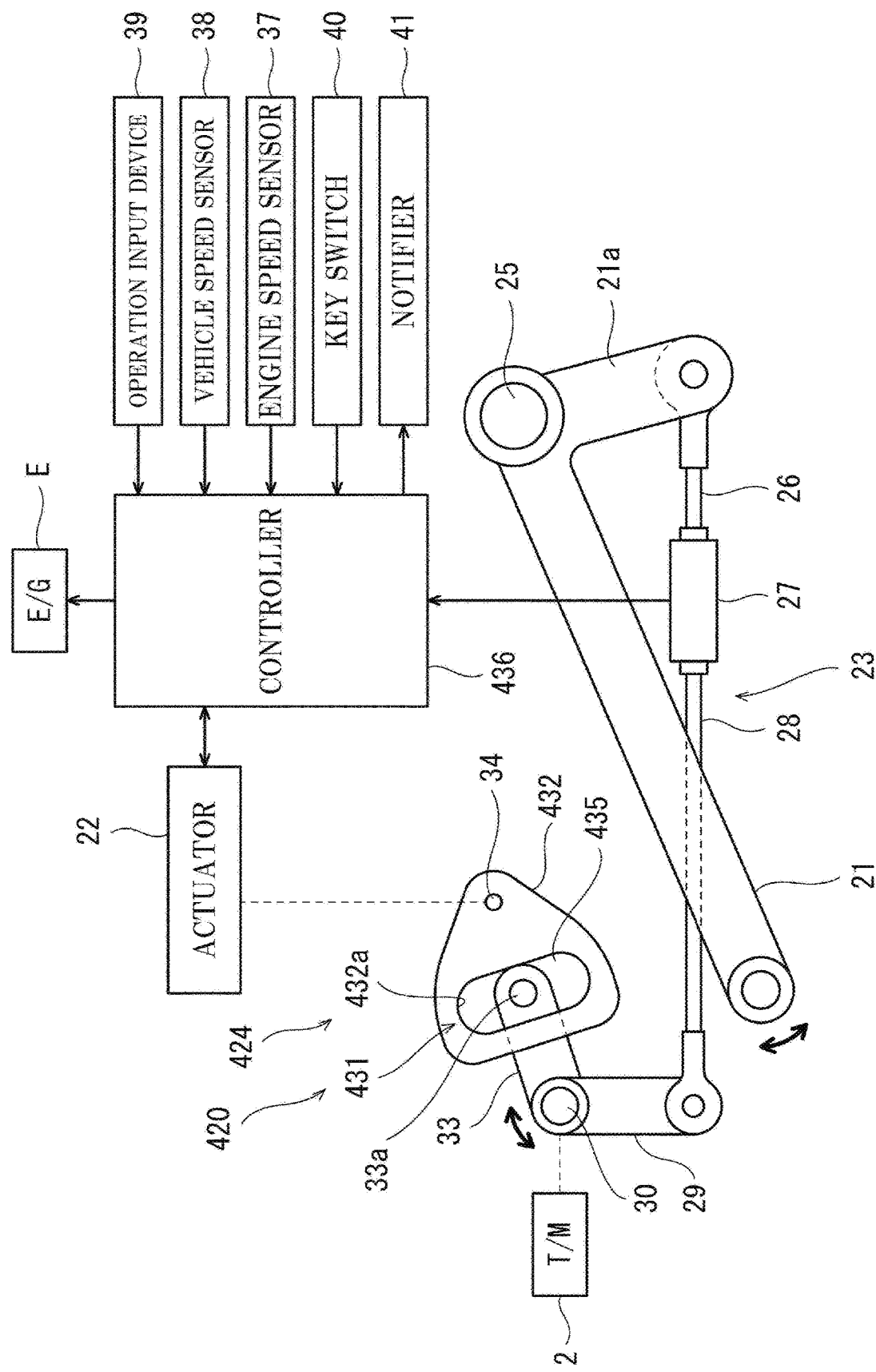
FIG. 11 is a schematic diagram of the operational configuration of a shifting system according to a fourth variant.

FIG. 11 is a schematic diagram of the operational configuration of a shifting system 420 according to a fourth variant. In the shifting system 420, as shown in FIG. 11, a play portion 435 of a unidirectional transmitting part 431 is formed in a region containing a part of the movement range over which the second engagement portion 33a moves in conjunction with the motion of the manual shifting power transmission mechanism 23. In particular, the region contains the center of the movement range. That is, the play portion 435 of FIG. 11 is smaller than the play portion 35 of FIG. 2, so that in manual shifting the distance the second engagement portion 33a moves until contact with an edge of a first engagement portion 432a is short.

If the load sensor 27 detects the start of operation of the shifting operation lever 21, the controller 436 drives the shifting actuator 22 such that contact of the second engagement portion 33a with an edge of the first engagement portion 432a is avoided. More specifically, the controller 436 drives the shifting actuator 22 such that the first engagement member 432 moves in the direction of movement of the second engagement portion 33a, namely in such a direction that an edge of the first engagement portion 432a moves away from the second engagement portion 33a moving toward the edge of the first engagement portion 432a.

In this configuration, a collision impact between the second engagement portion 33a and the first engagement portion 432a in a shifting process effected using the shifting actuator 22 can be reduced even though the amount of play in the play portion 435 is small. Additionally, since the play portion 435 is formed to contain the center of the movement range of the second engagement portion 33a, transmission of power from the manual shifting power transmission mechanism 23 to the shifting actuator 22 can be prevented in the early stage of a shifting process effected using the shifting operation lever 21. Further, when the second engagement portion 33a is about to contact the first engagement portion 432a because of the small amount of play in the play portion 435, the shifting actuator 22 is driven to move the first engagement member 432 such that the contact of the second engagement portion 33a with the first engagement portion 432a is avoided. This can prevent the shifting actuator 22 from causing mechanical resistance when the shifting operation lever 21 is operated.

Other Examples of Transmission-Equipped Vehicle

Figure 12:
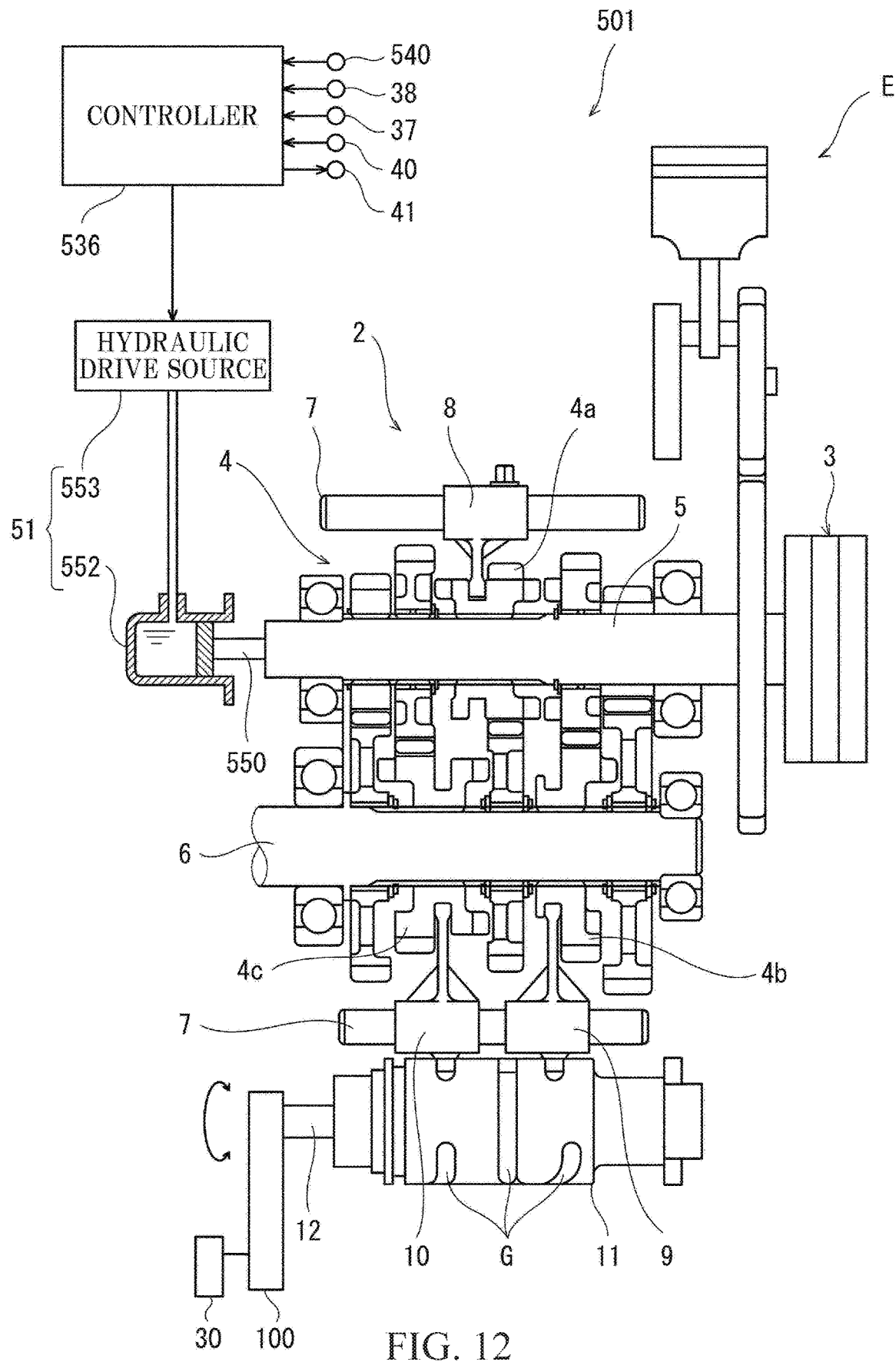
FIG. 12 is a schematic diagram illustrating another example of the transmission-equipped vehicle of the exemplary embodiment.

FIG. 12 is a schematic diagram showing another example (transmission-equipped vehicle 501) of the transmission-equipped vehicle according to the present embodiment. The elements identical to those of the vehicle 1 of FIG. 1 are denoted by the same reference signs and will not be described repeatedly. As shown in FIG. 12, the vehicle 501 is configured to enable automatic control of engagement/disengagement of the main clutch 3. Specifically, a rod 550 connected to the main clutch 3 is inserted in the input shaft 5 of the transmission 2, and a hydraulic piston device 552 is connected to an end of the rod 550 remote from the main clutch 3. A hydraulic drive source 553 is connected to the hydraulic piston device 552 to apply hydraulic pressure to the hydraulic piston device 552. The hydraulic pressure applied to the hydraulic piston device 552 is adjusted to cause the rod 550 to reciprocate and the main clutch 3 to be engaged or disengaged.

That is, the hydraulic piston device 552 and the hydraulic drive source 553 constitute a hydraulic actuator 551 (clutch actuator) that actuates the main clutch 3. To the hydraulic drive source 553 is connected a controller 536. To the controller 536 are connected the engine speed sensor 37, the vehicle speed sensor 38, and a gear position sensor 540. Although not shown in FIG. 12, the shifting system 20 previously described is mounted in the vehicle 501.

In the case previously described, where the ignition of the engine E is temporarily stopped to effect a shifting process without disengaging the main clutch 3 while the engine E is accelerating, the rotation of the engine E may become unstable if the engine E is stopped during low-speed travel such as during starting of the vehicle. Thus, when shifting is effected during low-speed travel such as during starting of the vehicle, the main clutch 3 is automatically disengaged to allow the vehicle to start smoothly without manual operation of the clutch by the operator while keeping stable the combustion in the engine E.

Specifically, if the gear position sensor 540 detects shifting of the transmission 2 from a neutral state to a power transmission state during low-speed travel in which the engine speed detected by the engine speed sensor 37 is lower than a predetermined threshold and the vehicle speed detected by the vehicle speed sensor 38 is lower than a predetermined threshold, the controller 536 drives the hydraulic actuator 551 to bring the main clutch 3 into a disengaged state. Thereafter, the controller 536 controls the hydraulic actuator 551 such that the main clutch 3 gradually enters an engaged state along with increase in the vehicle speed.

In this configuration, to achieve smooth starting of the vehicle, a half-clutch state where the main clutch 3 is partially engaged can be created without manual operation of the main clutch 3 by the operator. Thus, the starting operation can be accomplished easily and quickly. The main clutch 3 may be configured to be manually actuated by the operator operating a clutch lever, as well as being configured to be automatically actuated by hydraulic pressure. The clutch actuator is not limited to the hydraulic actuator 551 and may be another type of actuator (e.g., an electric actuator).

Examples of how to Dispose Shifting Actuator in Vehicle

Figure 13:
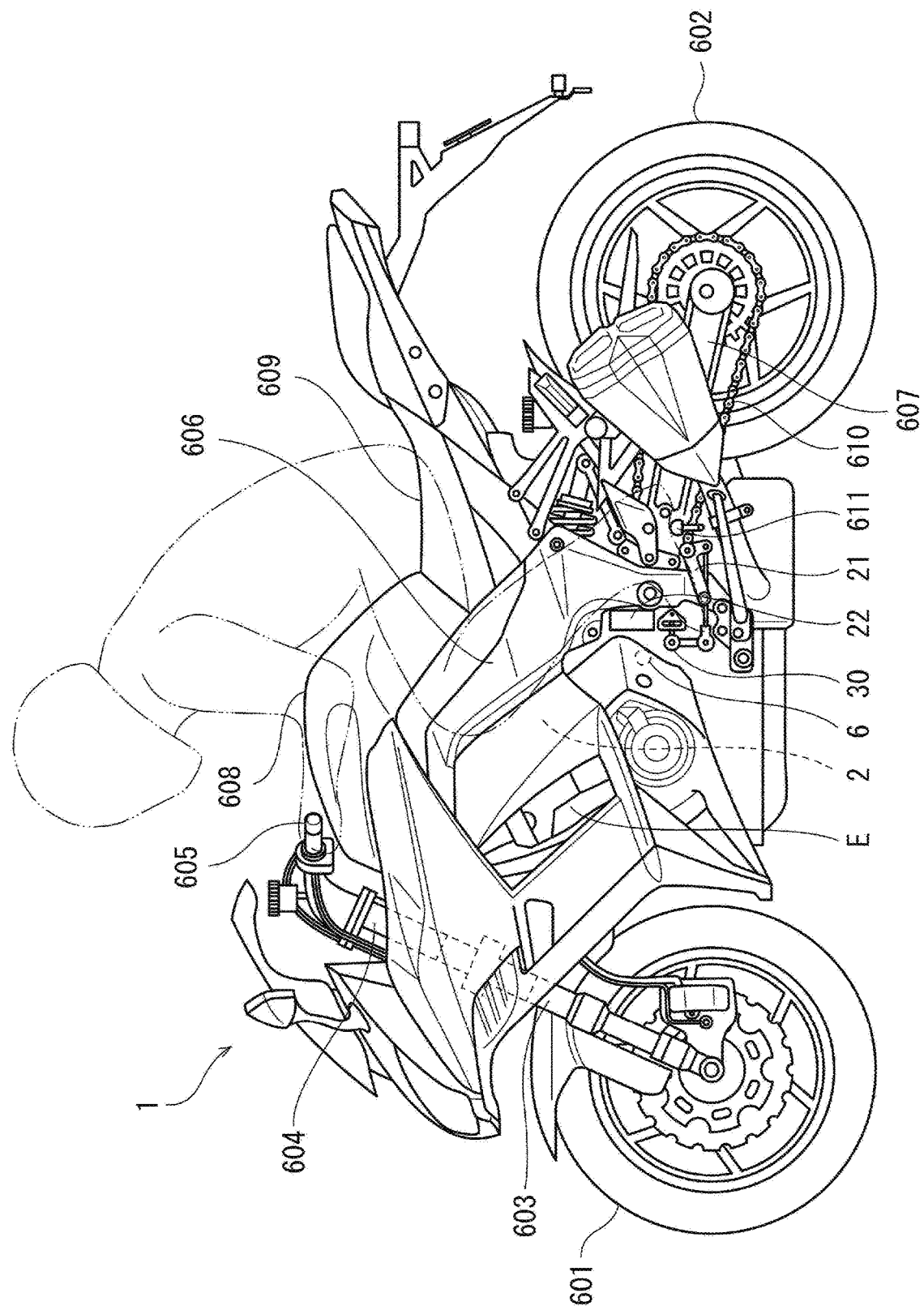
FIG. 13 is a side view illustrating a first example of how to dispose a shifting actuator in the vehicle when the vehicle is a motorcycle.
Figure 14:
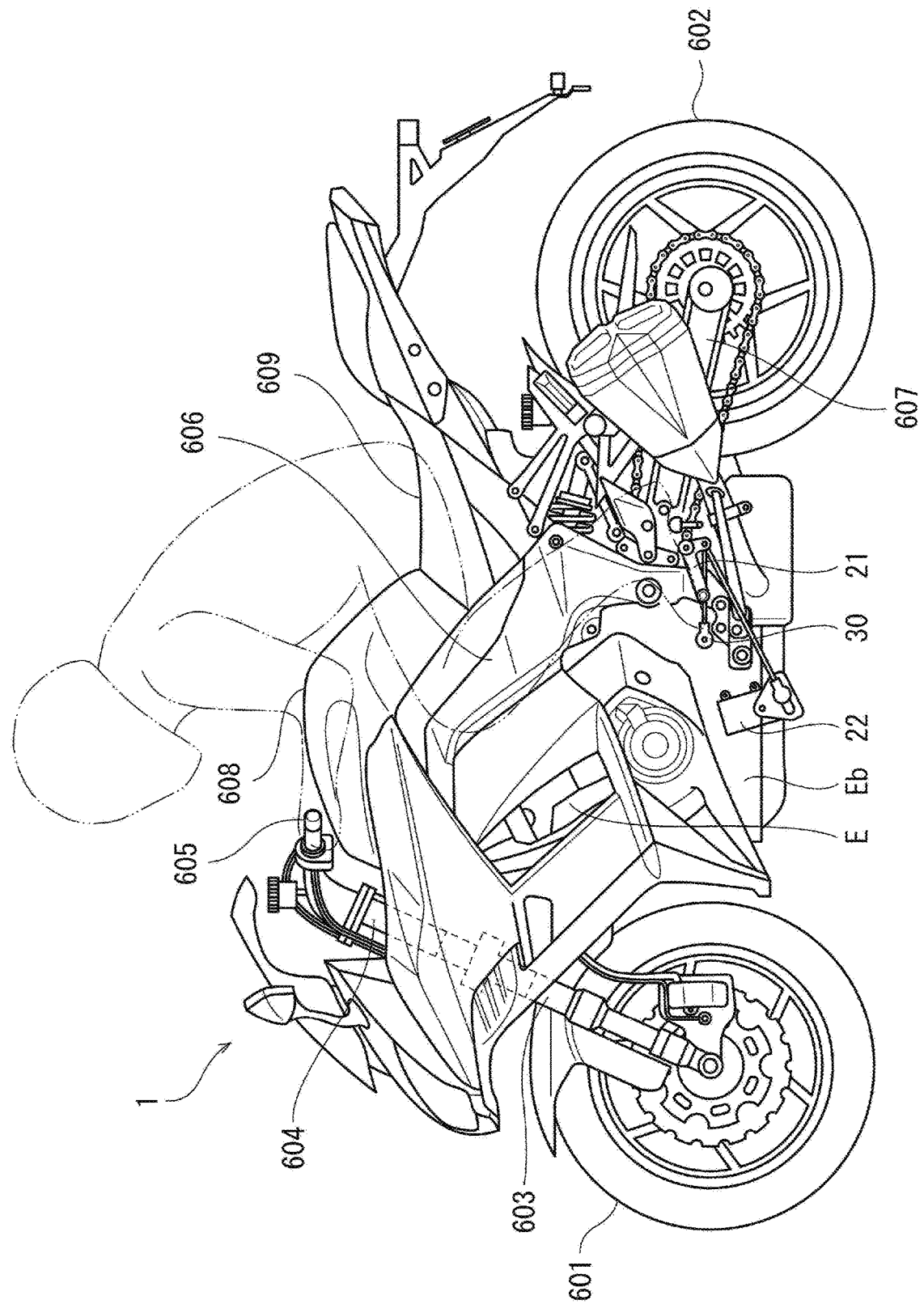
FIG. 14 is a side view illustrating a second example of how to dispose the shifting actuator in the vehicle when the vehicle is a motorcycle.

FIG. 13 is a side view illustrating a first example of how to dispose the shifting actuator 22 in the above-described vehicle 1 when the vehicle 1 is a motorcycle. FIG. 14 is a side view illustrating a second example of how to dispose the shifting actuator 22 in the vehicle 1 when the vehicle 1 is a motorcycle. As shown in FIG. 13, the motorcycle 1 includes a front wheel 601 and a rear wheel 602. The front wheel 601 is connected to front forks 603, and the front forks 603 are supported by a steering shaft (not shown) which is rotatably supported by a head pipe 604. A bar-shaped handle 605 gripped by the operator is mounted on the steering shaft and extends to both sides substantially in the vehicle width direction. The handle 605 is rotated by the operator to steer the motorcycle 1. The rotation of the handle 605 is transmitted to the front wheel 601 through the steering shaft, and thus the front wheel 601 is steered.

A frame 606 extends obliquely downward and rearward from the head pipe 604. A front end of a swing arm 607 is pivotally supported by the frame 606, and the rear wheel 602 is rotatably supported by a rear end of the swing arm 607. A fuel tank 608 is disposed rearward of the handle 605. A seat 609 on which the operator sits in a straddling position is disposed rearward of the fuel tank 608. The engine E supported by the frame 606 is disposed between the front and rear wheels 601 and 602. To the engine E is connected the transmission 2. Drive power output from the output shaft 6 of the transmission 2 is transmitted to the rear wheel 602 through a power transmission loop 610 (e.g., a chain or belt).

Steps 611 on which the operator places his/her feet are disposed below and on both sides of the seat 609. The shifting operation lever 21 for manual shifting is disposed forward of the step 611. The shifting actuator 22 for automatic shifting is disposed above the manual shifting power transmission mechanism 23 through which an operation force applied to the shifting operation lever 21 is transmitted to the rotary member 30 of the shift drum 11. Alternatively, as shown in FIG. 14, the shifting actuator 22 may be disposed forward of the shifting operation lever 21 and secured to a crankcase Eb of the engine E.

The present invention is not limited to the embodiments and variants described above, and changes, additions, or deletions can be made to the configurations of the above embodiments and variants. For example, some of the elements and methods in one embodiment or variant may be applied to another embodiment or variant. Some of the elements in one embodiment or variant may be extracted separately from the other elements in the one embodiment or variant. The shifting systems described above may be applied to four-wheeled vehicles rather than to two-wheeled vehicles. An electric motor may be used as the power source for travel instead of the engine E configured as an internal combustion engine. Both the engine and the electric motor may be used as the power source for travel. The shifting operation member is not limited to a lever operated by a foot and may be a member operated by a hand.

What is claimed is:

1. A transmission-equipped vehicle comprising:
a transmission that changes a speed of rotation produced by rotational power of a power source for travel of the vehicle;
a shifting operation member operated by an operator;
a manual shifting power transmission mechanism configured to transmit an operation force applied by the operator to the shifting operation member to the transmission as shifting power for a shifting process via at least a rod, a pivot arm, and a rotary member;
a shifting actuator;
an automatic shifting power transmission mechanism through which a drive force of the shifting actuator is transmitted to the manual shifting power transmission mechanism as the shifting power; and
a controller that controls the shifting actuator, wherein
the automatic shifting power transmission mechanism comprises a unidirectional transmitting part that, when the manual shifting power transmission mechanism is set in motion upon operation of the shifting operation member, cuts off transmission of the motion of the manual shifting power transmission mechanism to the shifting actuator and that permits transmission of the drive force of the shifting actuator to the manual shifting power transmission mechanism,
the automatic shifting power transmission mechanism further comprises: a first engagement member movable in conjunction with motion of the shifting actuator and provided with a first engagement portion; and a second engagement member movable in conjunction with the motion of the manual shifting power transmission mechanism and provided with a second engagement portion engageable with the first engagement portion,
the unidirectional transmitting part comprises a play portion formed between the first engagement portion and the second engagement portion on a relative motion path along which the second engagement member moves relative to the first engagement member in conjunction with the motion of the manual shifting power transmission mechanism,
the controller is configured to, during a predetermined non-shifting period, execute a first detection procedure that detects a center position of the first engagement portion on the relative motion path, and
in the first detection procedure,
the controller drives the shifting actuator to move the first engagement member from an original position of the first engagement portion in one direction along the relative motion path and acquires first position information representing a first position, the original position corresponding to a non-shifting position of the shifting actuator, the first position being a position where the first engagement portion moved in the one direction contacts the second engagement portion,
the controller drives the shifting actuator to move the first engagement member from the original position in the other direction along the relative motion path and acquires second position information representing a second position where the first engagement portion moved in the other direction contacts the second engagement portion,
the controller calculates the center position of the first engagement portion on the relative motion path from the acquired first position information and the acquired second position information, and
the controller compares the calculated center position to the original position and determines whether the original position is within a predetermined first range defined based on the center position.

2. The transmission-equipped vehicle according to claim 1, further comprising a notifier that provides a notification of abnormality, wherein
when the original position is outside the first range, the controller causes the notifier to provide the notification of abnormality.

3. The transmission-equipped vehicle according to claim 1, wherein when the original position is outside the first range, the controller sets the non-shifting position of the shifting actuator such that the calculated center position is set as the original position.

4. The transmission-equipped vehicle according to claim 1, further comprising a notifier that provides a notification of abnormality, wherein
when the original position is outside the first range and within a second range wider than the first range, the controller sets the non-shifting position of the shifting actuator such that the calculated center position is set as the original position, and
when the original position is outside the second range, the controller causes the notifier to provide the notification of abnormality.

5. The transmission-equipped vehicle according to claim 1, wherein in the first detection procedure,
the controller controls the drive force of the shifting actuator to a drive force for detection which is small enough not to set the manual shifting power transmission mechanism in motion,
the controller determines the first position as a position where, when the shifting actuator is driven by the drive force for detection, the first engagement portion moved by the drive force for detection in the one direction along the relative motion path comes to a stop, and
the controller determines the second position as a position where, when the shifting actuator is driven by the drive force for detection, the first engagement portion moved by the drive force for detection in the other direction along the relative motion path comes to a stop.

6. The transmission-equipped vehicle according to claim 5, wherein
the controller performs pulse width modulation (PWM) control of the drive force of the shifting actuator,
in the shifting process, the controller sets a duty cycle of the PWM control to a first duty cycle, and
in the first detection procedure, the controller sets the duty cycle of the PWM to a second duty cycle lower than the first duty cycle.

7. The transmission-equipped vehicle according to claim 1, wherein the predetermined non-shifting period is a period where a key switch is turned on.

8. The transmission-equipped vehicle according to claim 1, further comprising a change mechanism by which a shift drum is rotated to set a shift fork of the transmission in motion, wherein
the change mechanism comprises:
a change lever that pivots in conjunction with the motion of the manual shifting power transmission mechanism to rotate the shift drum in a stepwise fashion; and
a mechanical stopper that is secured to a case of the transmission and that physically restricts a range over which the change lever is pivotable, the controller is configured to, when the shifting process is effected, execute a second detection procedure that detects an actuator center position of the shifting actuator on a motion path of the shifting actuator, and in the second detection procedure, the controller drives the shifting actuator from the non-shifting position in one direction along the motion path of the shifting actuator and acquires third position information representing a third position where the change lever contacts the mechanical stopper, the controller drives the shifting actuator from the non-shifting position in the other direction along the motion path of the shifting actuator and acquires fourth position information representing a fourth position where the change lever contacts the mechanical stopper, the controller calculates the actuator center position of the shifting actuator on the motion path from the acquired third position information and the acquired fourth position information, and the controller compares the calculated actuator center position to the non-shifting position and determines whether the non-shifting position is within a predetermined third range defined based on the actuator center position.

9. A transmission-equipped vehicle comprising:

a transmission that changes a speed of rotation produced by rotational power of a power source for travel of the vehicle;

a shifting actuator;

an automatic shifting power transmission mechanism through which a drive force of the shifting actuator is transmitted to the transmission as shifting power for a shifting process;

a change mechanism by which a shift drum is rotated to set a shift fork of the transmission in motion; and a controller that controls the shifting actuator, wherein the change mechanism comprises:

a change lever that pivots in conjunction with motion of the automatic shifting power transmission mechanism to rotate the shift drum in a stepwise fashion; and a mechanical stopper that is secured to a case of the transmission and that physically restricts a range over which the change lever is pivotable, the controller is configured to, when the shifting process is effected, execute a detection procedure that detects an actuator center position of the shifting actuator on a motion path of the shifting actuator, and in the detection procedure, the controller drives the shifting actuator from a non-shifting position of the shifting actuator in one direction along the motion path of the shifting actuator and acquires first position information representing a first position where the change lever contacts the mechanical stopper, the controller drives the shifting actuator from the non-shifting position in the other direction along the motion path of the shifting actuator and acquires second position information representing a second position where the change lever contacts the mechanical stopper, the controller calculates the actuator center position of the shifting actuator on the motion path from the acquired first position information and the acquired second position information, and the controller compares the calculated actuator center position to the non-shifting position and determines whether the non-shifting position is within a predetermined range defined based on the actuator center position.

* * * * *